United States Patent
Shirato et al.

(10) Patent No.: US 10,675,899 B2
(45) Date of Patent: Jun. 9, 2020

(54) DETECTOR, IMAGE FORMING APPARATUS, READING APPARATUS, AND ADJUSTMENT METHOD

(71) Applicants: Takeo Shirato, Shizuoka (JP); Mitsunobu Gohda, Kanagawa (JP); Tomoaki Hayashi, Tokyo (JP)

(72) Inventors: Takeo Shirato, Shizuoka (JP); Mitsunobu Gohda, Kanagawa (JP); Tomoaki Hayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/006,582

(22) Filed: Jun. 12, 2018

(65) Prior Publication Data

US 2018/0361766 A1 Dec. 20, 2018

(30) Foreign Application Priority Data

Jun. 14, 2017 (JP) .................................. 2017-117250
May 7, 2018 (JP) .................................. 2018-089536

(51) Int. Cl.
*B41J 29/393* (2006.01)
*H04N 1/00* (2006.01)
(Continued)

(52) U.S. Cl.
CPC ........... *B41J 29/393* (2013.01); *B41J 2/2146* (2013.01); *B41J 11/0095* (2013.01);
(Continued)

(58) Field of Classification Search
CPC .... B41J 29/393; B41J 2/2146; B41J 11/0095; B41J 25/001
See application file for complete search history.

(56) References Cited

U.S. PATENT DOCUMENTS

2006/0158472 A1* 7/2006 Endo .................... B41J 11/0095
347/14
2008/0204681 A1* 8/2008 Murakami ........... B41J 11/0035
355/40

(Continued)

FOREIGN PATENT DOCUMENTS

JP 2015-013476 1/2015
JP 2016-035420 3/2016

(Continued)

OTHER PUBLICATIONS

U.S. Appl. No. 15/926,910, filed Mar. 20, 2018 Katsuhiro Tobita.
(Continued)

*Primary Examiner* — Jason S Uhlenhake
(74) *Attorney, Agent, or Firm* — Duft & Bornsen, PC

(57) ABSTRACT

A detector includes a light source to irradiate an object with light, a sensor to image a first pattern and a second pattern formed on the object with the light irradiated by the light source to generate image data, the first pattern and the second pattern imaged by the sensor at different times, and a circuit to control the light source to adjust a light quantity of the light according to a type of the object and irradiate the object with the light quantity adjusted according to the type of the object, and calculate a relative position of the object between the first pattern and the second pattern.

12 Claims, 28 Drawing Sheets

(51) Int. Cl.
- *B65H 43/08* (2006.01)
- *G01B 11/00* (2006.01)
- *H04N 1/028* (2006.01)
- *B41J 2/21* (2006.01)
- *B41J 11/00* (2006.01)
- *B41J 25/00* (2006.01)
- *B41J 2/01* (2006.01)

(52) U.S. Cl.
CPC ............ *B41J 25/001* (2013.01); *B65H 43/08* (2013.01); *G01B 11/00* (2013.01); *H04N 1/00814* (2013.01); *H04N 1/02885* (2013.01); *B41J 2/01* (2013.01)

(56) References Cited

U.S. PATENT DOCUMENTS

| | | | |
|---|---|---|---|
| 2012/0001972 A1* | 1/2012 | Nishioka | B41J 2/2135 347/12 |
| 2015/0009262 A1 | 1/2015 | Bell et al. | |
| 2016/0121602 A1 | 5/2016 | Nagasu et al. | |
| 2017/0106647 A1 | 4/2017 | Inoue | |
| 2017/0165960 A1 | 6/2017 | Sunaoshi et al. | |
| 2017/0165961 A1 | 6/2017 | Hayashi et al. | |
| 2017/0182764 A1 | 6/2017 | Nagasu et al. | |
| 2017/0266954 A1 | 9/2017 | Nagasu et al. | |
| 2017/0266965 A1 | 9/2017 | Gohda et al. | |
| 2017/0348969 A1 | 12/2017 | Chiba | |
| 2017/0355205 A1 | 12/2017 | Tobita et al. | |
| 2018/0022088 A1 | 1/2018 | Bando et al. | |

FOREIGN PATENT DOCUMENTS

| | | |
|---|---|---|
| JP | 2017-119428 | 7/2017 |
| JP | 2017-170889 | 9/2017 |

OTHER PUBLICATIONS

U.S. Appl. No. 15/921,616, filed Mar. 14, 2018 Masayuki Sunaoshi, et al.

U.S. Appl. No. 15/926,895, filed Mar. 20, 2018 Gohda Mitsunobu, et al.

U.S. Appl. No. 15/897,096, filed Feb. 14, 2018 Masahiro Mizuno, et al.

* cited by examiner

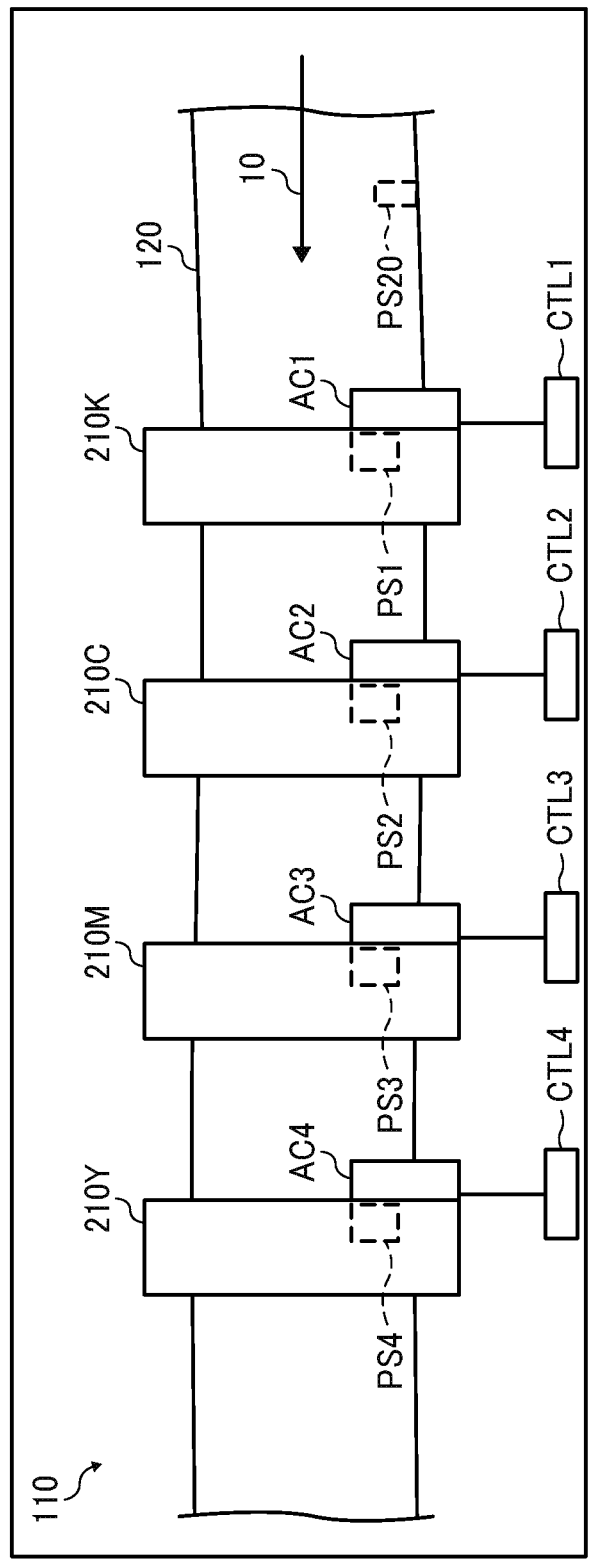

DETECTOR, IMAGE FORMING APPARATUS, READING APPARATUS, AND ADJUSTMENT METHOD

CROSS-REFERENCE TO RELATED APPLICATIONS

This patent application is based on and claims priority pursuant to 35 U.S.C. § 119(a) to Japanese Patent Application No. 2017-117250, filed on Jun. 14, 2017, and Japanese Patent Application No. 2018-089536, filed on May 7, 2018, in the Japan Patent Office, the entire disclosure of each of which are hereby incorporated by reference herein.

BACKGROUND

Technical Field

Aspects of the present disclosure relate to a detector, an image forming apparatus, a reading apparatus, and an adjustment method.

Related Art

There is an image forming method that performs various types of processes using an inkjet head (print head). For example, there is an image forming method that discharges ink from a print head (so-called inkjet method). Further, there is a method to improve an image quality of an image formed on an object in the image forming method.

For example, the method moves the print head to improve the image quality. Specifically, the method uses a sensor to detect a position change of the object such as a web in a lateral direction in a continuous sheet printing system. Then, the method moves the print head in the lateral direction to compensate the position change of the object (web) detected by the sensor.

Further, there is a method that images (captures) images at predetermined two places and calculates a moving speed of the object from correlation between the captured images.

SUMMARY

In an aspect of this disclosure, a detector includes a light source to irradiate an object with light, a sensor to image a first pattern and a second pattern formed on the object with the light irradiated by the light source, the first pattern and the second pattern imaged by the sensor at different times, and a circuit to control the light source to adjust a light quantity of the light according to a type of the object and irradiate the object with the light quantity adjusted according to the type of the object, and calculate a relative position of the object between the first pattern and the second pattern imaged by the sensor.

In another aspect of this disclosure, an image forming apparatus includes a detector to detect an object, and a head to form an image on the object according to a detection of the detector. The detector includes a light source to irradiate an object with light, a sensor to image a first pattern and a second pattern formed on the object with the light irradiated by the light source, the first pattern and the second pattern imaged by the sensor at different times, and a circuit to: control the light source to adjust a light quantity of the light according to a type of the object and irradiate the object with the light quantity adjusted according to the type of the object, calculate a relative position of the object between the first pattern and the second pattern imaged by the sensor, and control the head to form the image on the object according to the relative position.

In still another aspect of this disclosure, a reading apparatus includes a detector to detect an object, and a reading head to read an image on the object according to a detection of the detector. The detector includes a light source to irradiate an object with light, a sensor to image a first pattern and a second pattern formed on the object with the light irradiated by the light source, the first pattern and the second pattern imaged by the sensor at different times, and a circuit to: control the light source to adjust a light quantity of the light according to a type of the object and irradiate the object with the light quantity adjusted according to the type of the object, calculate a relative position of the object between the first pattern and the second pattern imaged by the sensor, and control the head to read the image on the object according to the relative position.

In still another aspect of this disclosure, an adjustment method includes irradiating an object with light, imaging a first pattern and a second pattern formed on the object with the light irradiated to the object, the first pattern and the second pattern imaged by the sensor at different times, adjusting a light quantity according to a type of the object, irradiating the object with the light quantity of the light adjusted according to the type of the object, and calculating a relative position of the object between the first pattern and the second pattern.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 3 is a schematic plan of the image forming apparatus according to the first embodiment of the present disclosure;

Figure 1:
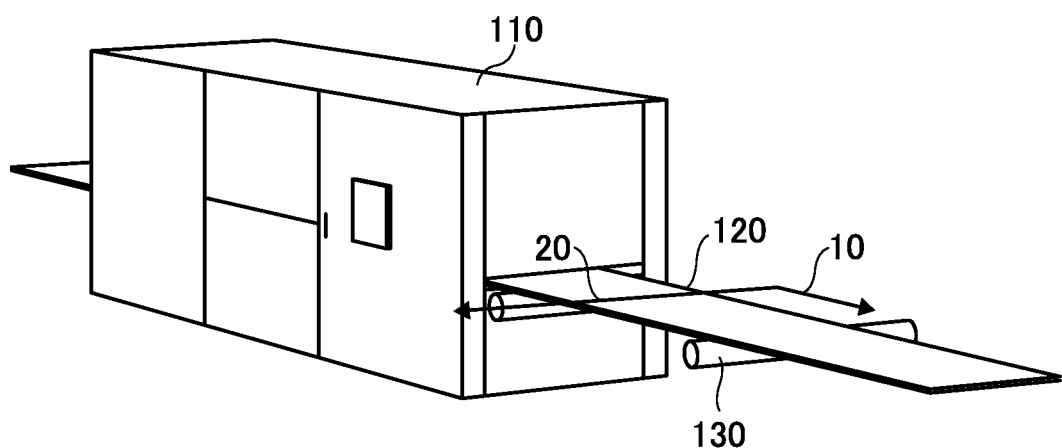
FIG. 1 is a schematic perspective view of an image forming apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in an analogous manner, and achieve similar results.

Although the embodiments are described with technical limitations with reference to the attached drawings, such description is not intended to limit the scope of the disclosure and all the components or elements described in the embodiments of this disclosure are not necessarily indispensable. As used herein, the singular forms "a", "an", and "the" are intended to include the plural forms as well, unless the context clearly indicates otherwise.

Hereinafter, embodiments of the present disclosure are described with reference to the attached drawings.

An embodiment is described below with reference to the drawings. For the following embodiments, components having the same function and configuration are appended with the same reference codes and redundant description thereof may be omitted.

A process apparatus including a detector is described below as an example. In this example, the process apparatus performs a process on an object with a head unit. As an example of the process apparatus, there is a liquid discharge apparatus that performs a process of discharging a liquid onto a web by the head unit.

The web is an example of an object on which an image is formed. The image is formed on the web when a liquid is discharged onto the web from the head unit. Hereinafter, an example of the liquid discharging apparatus is described below as an image forming apparatus that forms image on the object such as the web.

Further, a "liquid discharge head unit" that discharges liquid is described as an example of the "head unit", and the position in the web where the liquid lands is an example of "process position". Hereinafter, the "liquid discharge head unit" is simply referred to as the "head unit".

General Configuration

FIG. 1 is a schematic perspective view of an image forming apparatus according to a first embodiment of the present disclosure. In such an image forming apparatus, the liquid to be discharged is a recording liquid such as aqueous ink or oil-based ink. The image forming apparatus 110 includes a conveyor to convey an object such as a web 120.

Examples of the "object" include a recording medium. The web 120 is an example of the recording medium. In the illustrated example, the image forming apparatus 110 includes a roller 130 and the like to convey the web 120 and discharges liquid onto the web 120 to form an image on the web 120. The web 120 is a so-called continuous sheet. That is, the web 120 is, for example, paper in the form of roll that can be wound around a roller.

The image forming apparatus 110 is a so-called production printer. In the following description, the roller 130 adjusts a tension of the web 120 and conveys the web 120 in a conveyance direction 10 as indicated by arrow in FIG. 1. Further, in the following description, a direction perpendicular to the conveyance direction 10 is referred to as an orthogonal direction 20. In this example, the image forming apparatus 110 is an inkjet printer to discharge four color inks, namely, black (K), cyan (C), magenta (M), and yellow (Y) inks, to form an image on a predetermined position of the web 120.

Figure 2:
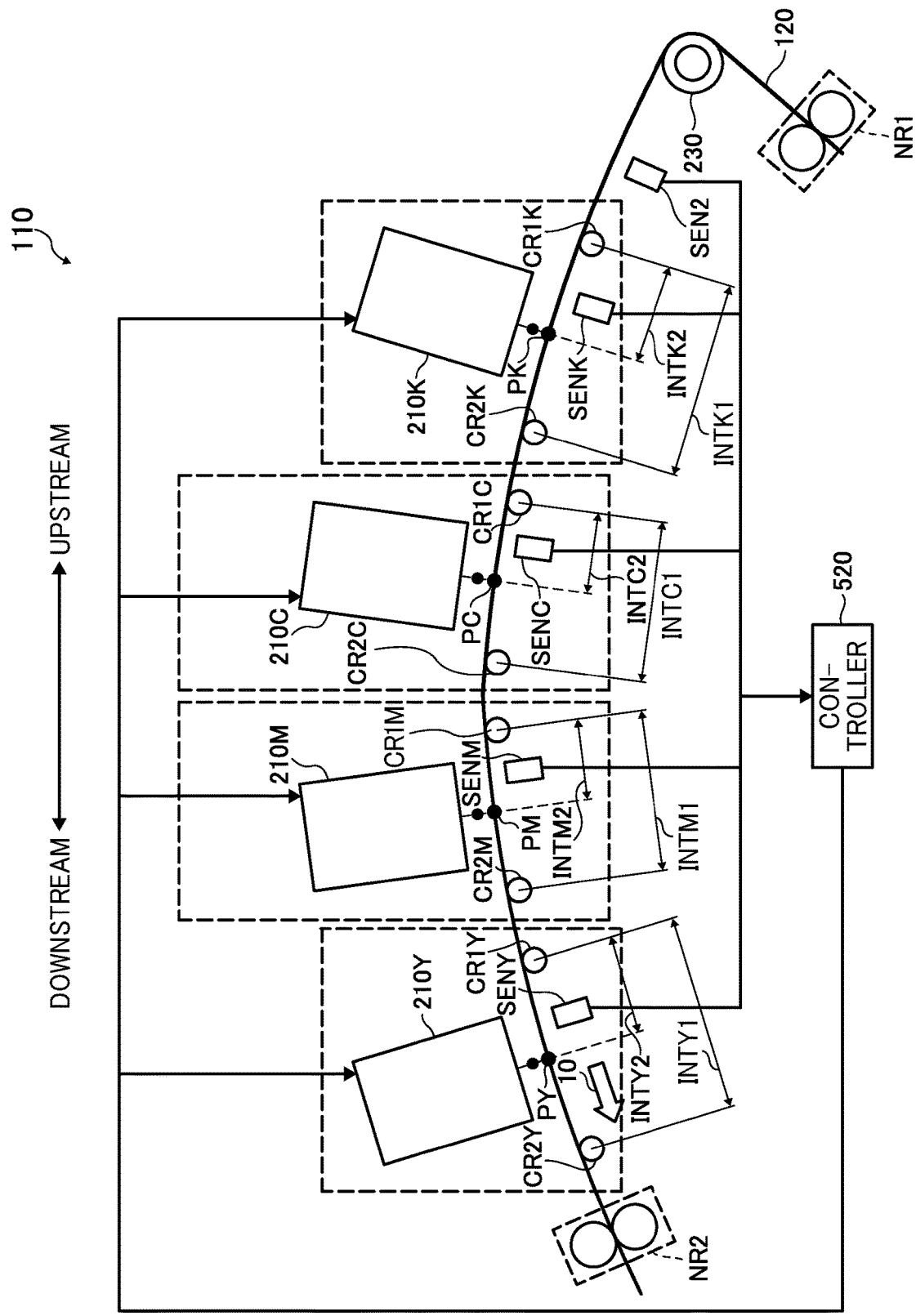
FIG. 2 is a schematic cross-sectional view of the image forming apparatus according to the first embodiment of the present disclosure.

FIG. 2 is a schematic cross-sectional view illustrating a general structure of the image forming apparatus 110 according to a first embodiment of the present disclosure. As illustrated in FIG. 2, the image forming apparatus 110 includes four liquid discharge head units 210 (210Y, 210M, 210C, and 210K) to discharge four colors of inks, respectively. Hereinafter, the "liquid discharge head unit" is simply referred to as "head unit".

Each of the head units 210 discharges a corresponding color of ink onto the web 120 conveyed in the conveyance direction 10. The image forming apparatus 110 includes two pairs of nip rollers NR1 and NR2, a roller 230, and the like, to convey the web 120. One of the two pairs of nip rollers are a first nip roller pair NR1 disposed upstream from the head units 210 in the conveyance direction 10.

The other of the two pairs of nip rollers is a second nip roller pair NR2 disposed downstream from the first nip roller pair NR1 and the head units 210 in the conveyance direction 10. Each of the nip roller pairs NR1 and NR2 rotates while nipping the object, such as the web 120, as illustrated in FIG. 2. The nip roller pairs NR1 and NR2 and the roller 230 together serve as a mechanism to convey the object (e.g., the web 120) in the conveyance direction.

The recording medium such as the web 120 is preferably a long sheet. Specifically, the web 120 is preferably longer than a distance between the first nip roller pair NR1 and the second nip roller pair NR2. The recording medium is not limited to the web 120. For example, the recording medium may be a folded sheet (so-called fanfold paper or Z-fold paper).

In the general structure illustrated in FIG. 2, the head units 210 are arranged in the order of black (K), cyan (C), magenta (M), and yellow (Y) from upstream to downstream in the conveyance direction 10. Specifically, a head unit 210K for black (K) is disposed on the most upstream in the conveyance direction 10. A head unit 210C for cyan (C) is disposed next to and downstream from the head unit 210K. Further, a head unit 210M for magenta (M) is disposed next to and downstream from the head unit 210C for cyan (C). Further, a head unit 210Y for yellow (Y) is disposed on the most downstream in the conveyance direction 10.

Each of the head units 210 discharges a corresponding color of ink to a predetermined position on the web 120 according to the image data, for example. A position at which the head unit 210 discharges ink (hereinafter "ink discharge position") is almost identical to a position at which ink droplets discharged from the liquid discharge head unit 210 strike the surface of the recording medium (hereinafter "ink discharge position"). In other words, the ink landing position may be directly below the ink discharge position of the head unit 210. Thus, "ink discharge position" is almost identical to the "ink landing position", and the "ink discharge position" on the web 120 can be changed by controlling the "ink discharge position" of the head unit 210.

In the present embodiment, black ink is discharged onto the ink discharge position of the head unit 210K (hereinafter "black ink discharge position PK"). Similarly, cyan ink is discharged onto the ink discharge position of the head unit 210C (hereinafter "cyan ink discharge position PC"). Magenta ink is discharged onto the ink discharge position of the head unit 210M (hereinafter "magenta ink discharge position PM"). Yellow ink is discharged onto the ink discharge position of the head unit 210Y (hereinafter "yellow ink discharge position PY").

The controller 520 controls a process timing at which each head unit 210 discharges ink. The controller 520 also controls actuators AC1, AC2, AC3, and AC4 provided for each head unit 210. The controller 520 is connected to each head unit 210. Both of the control of the process timing and the actuators AC1, AC2, AC3, and AC4 may be performed by two or more controllers or circuits, instead of being performed by the controller 520. A detail of the actuators is described below.

In FIG. 2, each head unit 210 is provided with a plurality of rollers. For example, in FIG. 2, the image forming apparatus 110 includes the plurality of rollers respectively disposed upstream and downstream from each head unit 210. Thus, the head units 210 are disposed between the plurality of rollers in the conveyance direction 10.

Specifically, a first roller CR1K to convey the web 120 to the black ink discharge position PK is disposed upstream from the head unit 210K for black. Similarly, the roller disposed downstream from the head unit 210K is referred to as a second roller CR2K to convey the web 120 from the ink discharge position PK. Disposing the first roller CR1 and the second roller CR2 for each ink discharge position PK, PC, PM, and PY can suppress fluttering of the recording medium conveyed at each ink discharge position. Here, the first roller CR1 and the second roller CR2 used to convey the web 120 (recording medium) are driven rollers. Alternatively, the first roller CR1 and the second roller CR2 may be driven by a motor or the like.

Note that the first roller CR1 as an example of the first support and the second roller CR2 as an example of the second support do not have to be a rotating body such as a driven roller. Thus, the first support and the second support may be members that support the object (web 120). For example, each of the first and second supports may be a pipe or a shaft having a round (circular) cross section. Alternatively, each of the first and second supports may be a curved plate having a curved face to contact the object (web 120). In the following description, the first support is the first roller CR1, and the second support is the second roller CR2.

Specifically, a first roller CR1K for black to convey the web 120 to the black ink discharge position PK is disposed upstream from the head unit 210K in the conveyance direction 10. A second roller CR2K for black conveys the web 120 from the black ink discharge position PK to the downstream side in the conveyance direction 10.

Similarly, a first roller CR1C and a second roller CR2C for cyan are disposed upstream and downstream from the head unit 210C for cyan, respectively, in the conveyance direction 10. Similarly, a first roller CR1M and a second roller CR2M for magenta are disposed upstream and downstream from the head unit 210M, respectively, in the conveyance direction 10. Similarly, a first roller CR1Y and a second roller CR2Y for yellow are disposed upstream and downstream from the head unit 210Y, respectively, in the conveyance direction 10.

The image forming apparatus 110 includes, for example, at least one sensor device (e.g., sensor devices SENK, SENC, SENM, and SENY, also collectively "sensor device SEN") for the head units, respectively, as illustrated in FIG. 2. The sensor device SEN detects a position of the web 120 in the conveyance direction 10, the orthogonal direction 20, or both of the conveyance direction 10 and the orthogonal direction 20. The sensor device SEN includes an optical sensor OS that utilizes light such as visible light or infrared light, for example.

For example, the optical sensor OS is a charge-coupled device (CCD) camera or a complementary metal oxide semiconductor (CMOS) camera. The sensor device SEN may not include the optical sensor OS, but preferably includes a two-dimensional sensor. The sensor device SEN, for example, detects the surface of the web 120. Further, the sensor device SEN is capable of detecting a back surface or a front surface of the web 120 as the object (recording medium) during image formation as described below.

Further, the sensor device SEN includes a laser light source that emits laser light as described below. As the laser light emitted from a light-emitting element is diffused on the surface of the web 120 and superimposed diffusion waves interfere with each other, a pattern such as a speckle pattern appears. The optical sensor OS of each of the sensor devices SEN captures and images the speckle pattern, for example, to generate image data. Based on a position change of the speckle pattern captured by the optical sensor OS, the image forming apparatus 110 can obtain a moving amount of each of the head units 210 to move the head units 210 and discharge timing of each of the head units 210, for example.

Hereinafter, the term "sensor position" means a position where a detection of the position of the web 120, etc., is performed by the sensor devices SEN. Accordingly, it is not necessary that all components relating to the detection are disposed at the "sensor position". That is, the hardware constituting a detector may be installed at a position where the detection is performed. On the other hand, only the optical sensor OS may be installed at a position where detection is performed as a sensor, and the other devices may be connected to the optical sensor OS with a cable and placed at another position. Further, in the following description, each sensor such as the optical sensor OS is sometimes simply referred to as "sensor" as a whole.

The sensor device SEN is preferably disposed closer to the ink discharge position of the head unit 210. The sensor is installed for each of the head units 210.

Specifically, in the example as illustrated in FIG. 2, the sensor device SENK for black is preferably disposed in an inter-roller range INTK1 for black between the first and second rollers CR1K and CR2K for black. In FIG. 2, the inter-roller range INTK1 for black is disposed between the first and second rollers CR1K and CR2K for black.

Similarly, the sensor device SENC for cyan is preferably disposed in an inter-roller range INTC1 for cyan between the first and second rollers CR1C and CR2C. In FIG. 2, the inter-roller range INTC1 for cyan is disposed between the first and second rollers CR1C and CR2C for cyan.

The sensor device SENM for magenta is preferably disposed in an inter-roller range INTM1 between the first and second rollers CR1M and CR2M. In FIG. 2, the inter-roller range INTM1 for magenta is disposed between the first and second rollers CR1M and CR2M for magenta.

The sensor device SENY for yellow is preferably disposed in an inter-roller range INTY1 between the first and second rollers CR1Y and CR2Y for yellow. In FIG. 2, the inter-roller range INTY1 for yellow is disposed between the first and second rollers CR1Y and CR2Y for yellow.

The "sensor positions" are preferably between the first and second rollers CR1 and CR2 and at positions close to the first rollers CR1 from the ink discharge positions PK, PC, PM, and PY, respectively. In other words, the "sensor position" is preferably upstream from ink discharge position in the conveyance direction 10.

Specifically, the sensor device SENK for black is, more preferably, disposed in a range extending from the black ink discharge position PK upstream to the first roller CR1K for black in the conveyance direction 10 (hereinafter "upstream range INTK2").

Similarly, the sensor device SENC for cyan is, more preferably, disposed in a range extending from the cyan ink discharge position PC upstream to the first roller CR1C for cyan (hereinafter "upstream range INTC2").

The sensor device SENM for magenta is, more preferably, disposed in a range extending from the magenta ink discharge position PM upstream to the first roller CR1M for magenta (hereinafter "upstream range INTM2").

The sensor device SENY for yellow is, more preferably, disposed in a range extending from the yellow ink discharge position PY upstream to the first roller CR1Y for yellow (hereinafter "upstream range INTY2").

When the sensor devices SEN are respectively disposed in the upstream ranges INTK2 for black, INTC2 for cyan, INTM2 for magenta, and INTY2 for yellow, the image forming apparatus 110 can detect the position or the like of the web 120 (object) with a high accuracy. The sensor devices SENK, SENC, SENM, and SENY are thus disposed upstream from the ink discharge position (ink landing position) PK, PC, PM, and PY, respectively, in the conveyance direction 10. Therefore, the image forming apparatus 110 detects the positions or the like of the web 120 in the conveyance direction 10, the orthogonal direction 20, or both, at a position upstream from the ink discharge positions PK, PC, PM, and PY by the sensor devices SENK, SENC, SENM, and SENY, respectively.

Thus, the image forming apparatus 110 can calculate respective ink discharge timings (i.e., process timing) of the head units 210, the amount by which the head unit 210 is to move (i.e., head moving amount), or both. That is, after the position or the like of the web 120 is detected upstream from the ink discharge positions PK, PC, PM, and PY, the web 120 is conveyed to the ink discharge positions PK, PC, PM, and PY.

While the web 120 is conveyed to the ink discharge positions PK, PC, PM, and PY, the image forming apparatus 110 can calculate the process timing or move the head unit 210 to change the ink discharge positions PK, PC, PM, and PY (process position). Thus, the image forming apparatus 110 can change the process position (ink discharge position) with a high accuracy.

On the other hand, if the "sensor positions" where the sensor is installed is directly below each head unit 210, the process position (ink discharge position, or ink landing position) may be shifted due to a delay in control operation or the like. Accordingly, the "sensor positions (sensor devices SENK, SENC, SENM, SENY)" are disposed upstream from the ink discharge positions PK, PC, PM, and PY, respectively. Thus, the image forming apparatus 110 can reduce shifting of the process position (ink discharge position) and control the process position (ink discharge position) with a high accuracy.

There is a case in which it is difficult to dispose the sensor devices SEN adjacent to the ink discharge positions PK, PC, PM, and PY. However, if the delay in the control operation is ignored, the "sensor positions" may be directly under each of the head units 210 or the like. If the sensor devices SEN are disposed directly below the head units 210, respectively, the sensor devices SEN can detect an accurate moving amount of the web 120 directly below the head unit 210. Therefore, in a configuration capable of performing the control operation at a faster speed, the sensor devices SEN are preferably disposed closer to the position directly below each head units 210.

Alternatively, in a configuration in which an error is tolerable, the sensor position (sensor devices SEN) may be disposed directly below the head unit 210, or downstream from a position directly below the head unit 210 in the inter-roller range INT1 between the first roller CR1 and the second roller CR2.

As illustrated in FIG. 2, the image forming apparatus 110 preferably includes at least one sensor SEN2 disposed upstream from the sensor devices SEN of each of the head units 210. Specifically, the image forming apparatus 110 preferably includes a second sensor device SEN2 in addition to sensor devices SEN installed for each of the head units 210. Hereinafter, as illustrated in FIG. 2, an example of installing the second sensor device SEN2 in the image forming apparatus 110 is described below.

FIG. 3 is a schematic plan view illustrating a configuration of the image forming apparatus 110 according to a first embodiment of the present disclosure.

Referring to FIG. 3, when viewed in a direction vertical to a recording surface of the web 120, for example, each of the sensor devices SEN is preferably disposed at a position close to an end of the web 120 in a width direction (the orthogonal direction 20) of the web 120 and overlapping with the web 120. Each of the sensor devices SEN is arranged at the positions PS20, PS1, PS2, PS3, and PS4, respectively. In the configuration illustrated in FIGS. 2 and 3, the controller 520 can control actuators AC1, AC2, AC3, and AC4 to move the head units 210K, 210C, 210M, and 210Y, respectively, in the orthogonal direction 20 perpendicular to the conveyance direction 10 of the web 120.

As illustrated in FIGS. 2 and 3, the sensor devices SEN are disposed facing a back side of the web 120 opposite the head units 210. That is, the sensor devices SEN are disposed opposite to positions where each of the head units 210 are installed with respect to the web 120.

The image forming apparatus 110 includes actuator controllers CTL1, CTL2, CTL3, and CTL4 connected to the actuators AC1, AC2, AC3, and AC4, respectively to control the actuators AC1, AC2, AC3, and AC4. Hereinafter, the actuators AC1, AC2, AC3 and AC4 are collectively referred to as "actuator AC". Hereinafter, the actuator controllers CTL1, CTL2, CTL3 and CTL4 are collectively referred to as "actuator controller CTL".

The actuator AC is, for example, a linear actuator or a motor. Further, the actuator AC may include a control circuit, a power supply circuit, mechanical parts, and the like.

The actuator controllers CTL1, CTL2, CTL3 and CTL4 are, for example, driver circuits and the like.

Figure 4A:
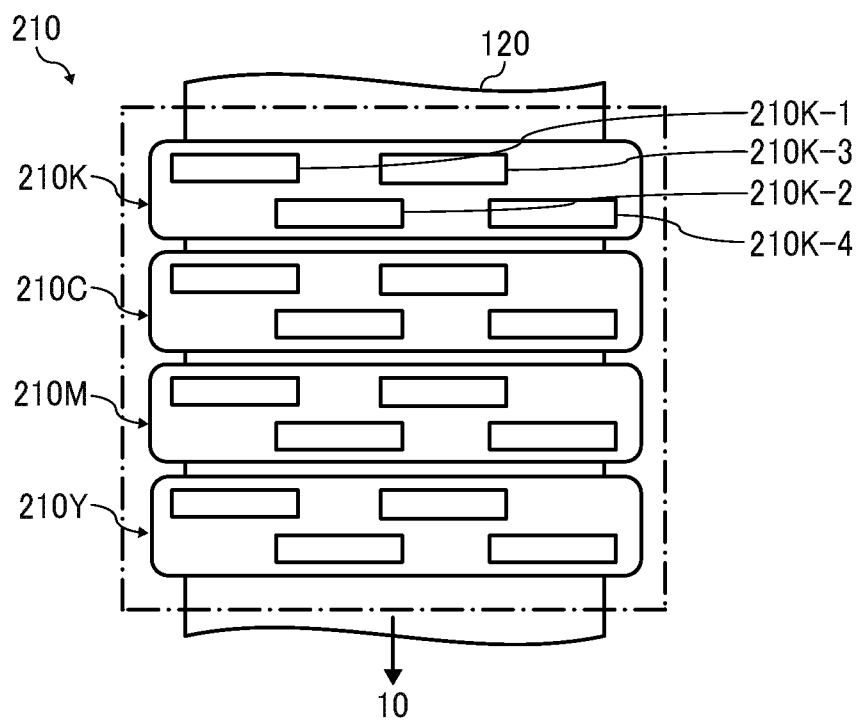
FIGS. 4A and 4B are schematic views illustrating external shapes of the head unit according to the present disclosure.
Figure 4B:
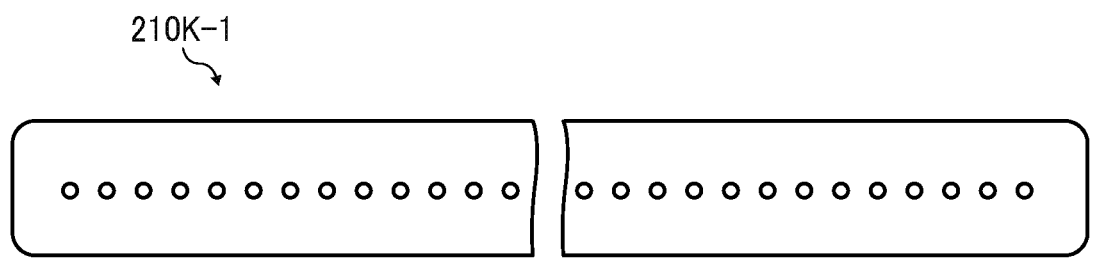

FIGS. 4A and 4B are schematic views illustrating external shapes of the head unit 210 according to the present disclosure. FIG. 4A is a schematic plan view of one of the four head units 210K to 210Y of the image forming apparatus 110. FIG. 4B is a schematic plan view of one of a liquid discharge head 210K-1 for black in the head unit 210K for black according to the present disclosure. Hereinafter, the "liquid discharge head" is simply referred to as "head".

As illustrated in FIG. 4A, the head units 210 (210K, 210C, 210M, and 210Y) according to the present embodiment are a line-type head unit.

The head unit 210K includes four heads 201K-1, 210K-2, 210K-3, and 210K-4 for black arranged in a staggered manner in the orthogonal direction 20 perpendicular to the conveyance direction 10. The head 210K-1 has a shape as illustrated in FIG. 4B. With this arrangement, the head unit 210K for black can form an image throughout the image formation area (so-called printing area) on the web 120 in the width direction (orthogonal direction 20) perpendicular to the conveyance direction 10 with black ink. Each of the other head units 210C, 210M, and 210Y has a similar structure with the head unit 210K, and thus the descriptions of which is omitted.

Although an example of the head units 210 each including four heads is described above, alternatively, the head unit 210 may include a single head.

[Example of Detector]

Figure 5:
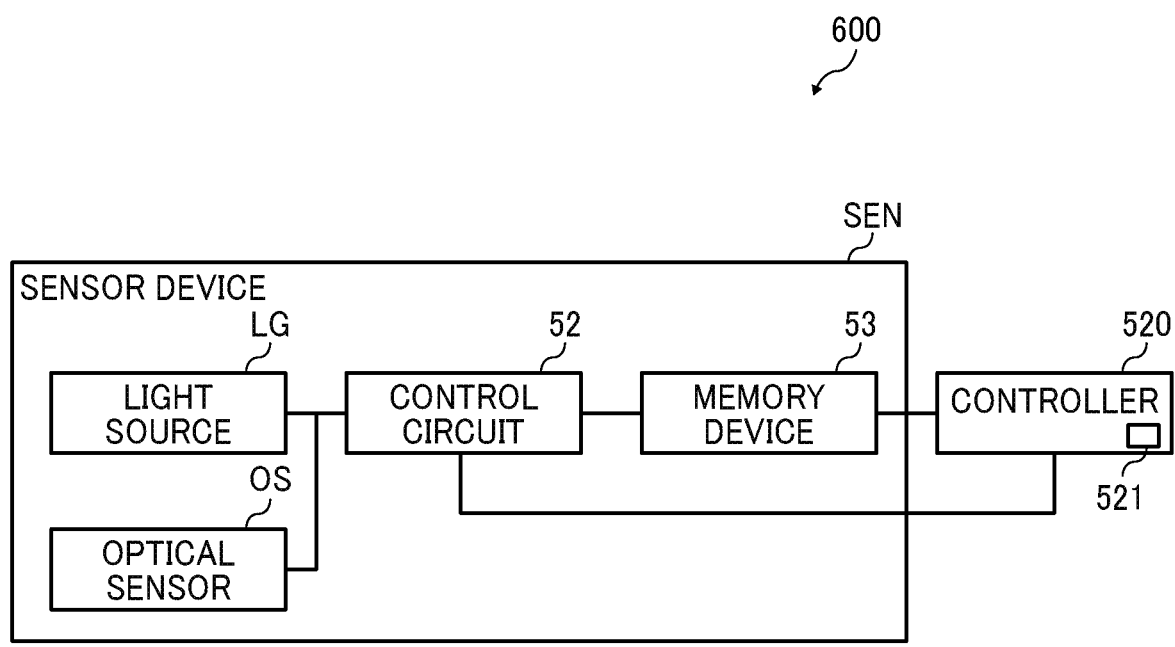
FIG. 5 is a schematic block diagram illustrating a hardware configuration of a detector according to a first embodiment of the present disclosure.

FIG. 5 is a schematic block diagram illustrating a hardware configuration of a detector 600 according to a first embodiment of the present disclosure. For example, the detector 600 includes a hardware such as the sensor device SEN and a controller 520 as illustrated in FIG. 5. The sensor device SEN includes a light source LG, an optical sensor OS, a control circuit 52, and a memory device 53.

A specific structure of the sensor device SEN is described below.

Figure 6:
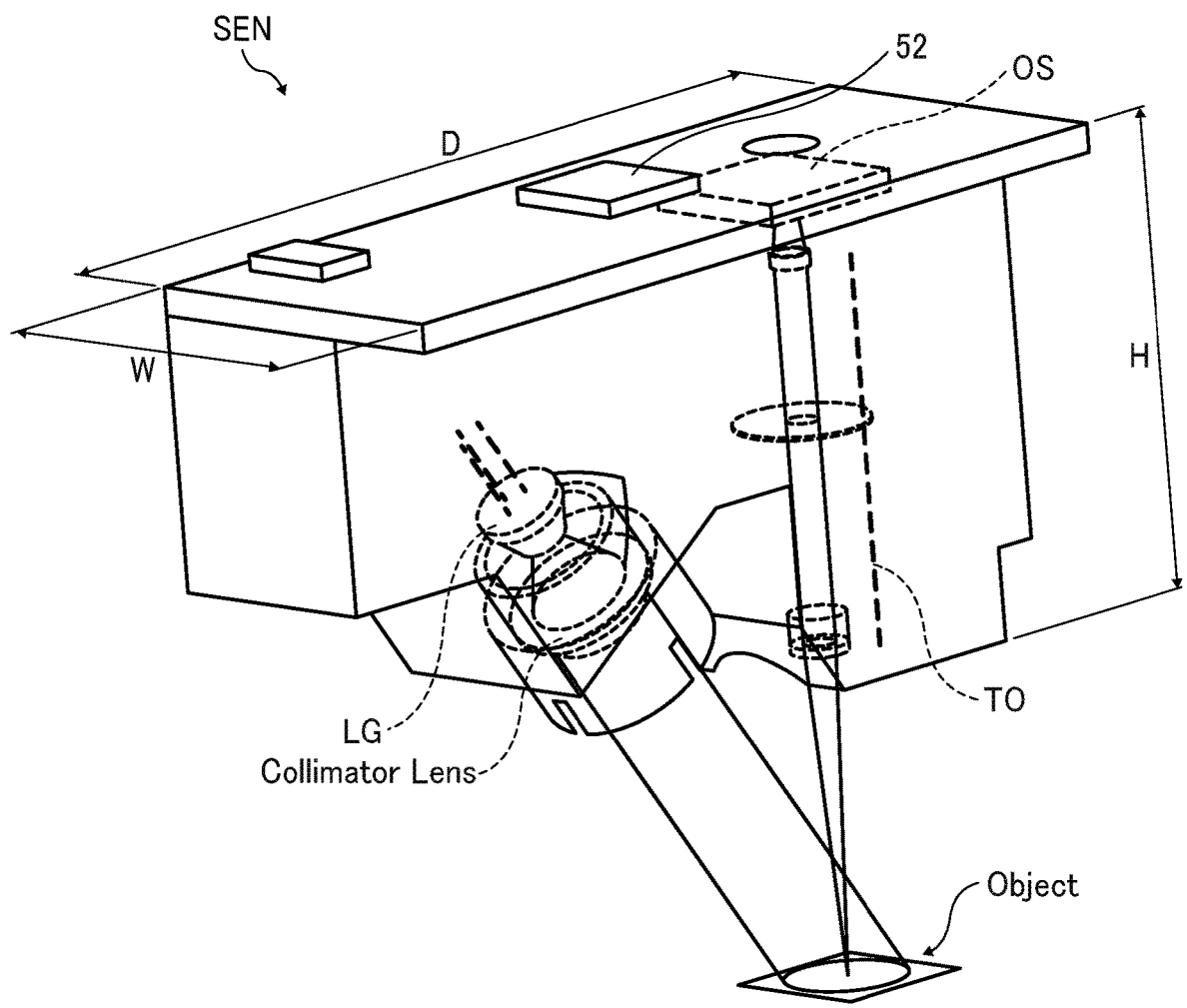
FIG. 6 is an external perspective view of a sensor device according to the present disclosure.

FIG. 6 is an external perspective view of the sensor device SEN according to the present embodiment. The sensor device SEN illustrated in FIG. 6 is configured to capture and image a pattern such as the speckle pattern described above. The speckle pattern appears on a surface of the web 120 (object) when the web 120 is irradiated with a light from the light source LG. Specifically, the sensor device SEN has a laser light source as an example of the light source LG.

The sensor device SEN includes an optical system such as collimate optical system using a collimator lens (CL). The sensor device SEN further includes a CMOS image sensor and a telecentric optical system TO to capture and image the pattern such as the speckle pattern. The CMOS image sensor serves as the optical sensor OS. The telecentric optical system TO condenses light to form an image of the speckle pattern on the CMOS image sensor (optical sensor OS).

For example, the optical sensor OS captures and images the pattern such as the speckle pattern. The controller 520 in FIG. 5 performs processing such as cross-correlation calculation based on a pattern imaged by one optical sensor OS of one sensor device SEN and a pattern imaged by another optical sensor OS of another sensor device SEN to obtain a position of a correlation peak.

Next, the controller 520 outputs an amount of movement of the web 120 (object) moved from the one optical sensor OS to another optical sensor OS based on an amount of displacement of the position of the correlation peak calculated by the correlation operation. In the example illustrated in FIG. 6, the sensor device SEN is 15 mm in width as indicated by arrow W, 60 mm in depth indicated by arrow D, and 32 mm in height indicated by arrow H (15×60×32). A detail of the correlation operation is described below.

Figure 7:
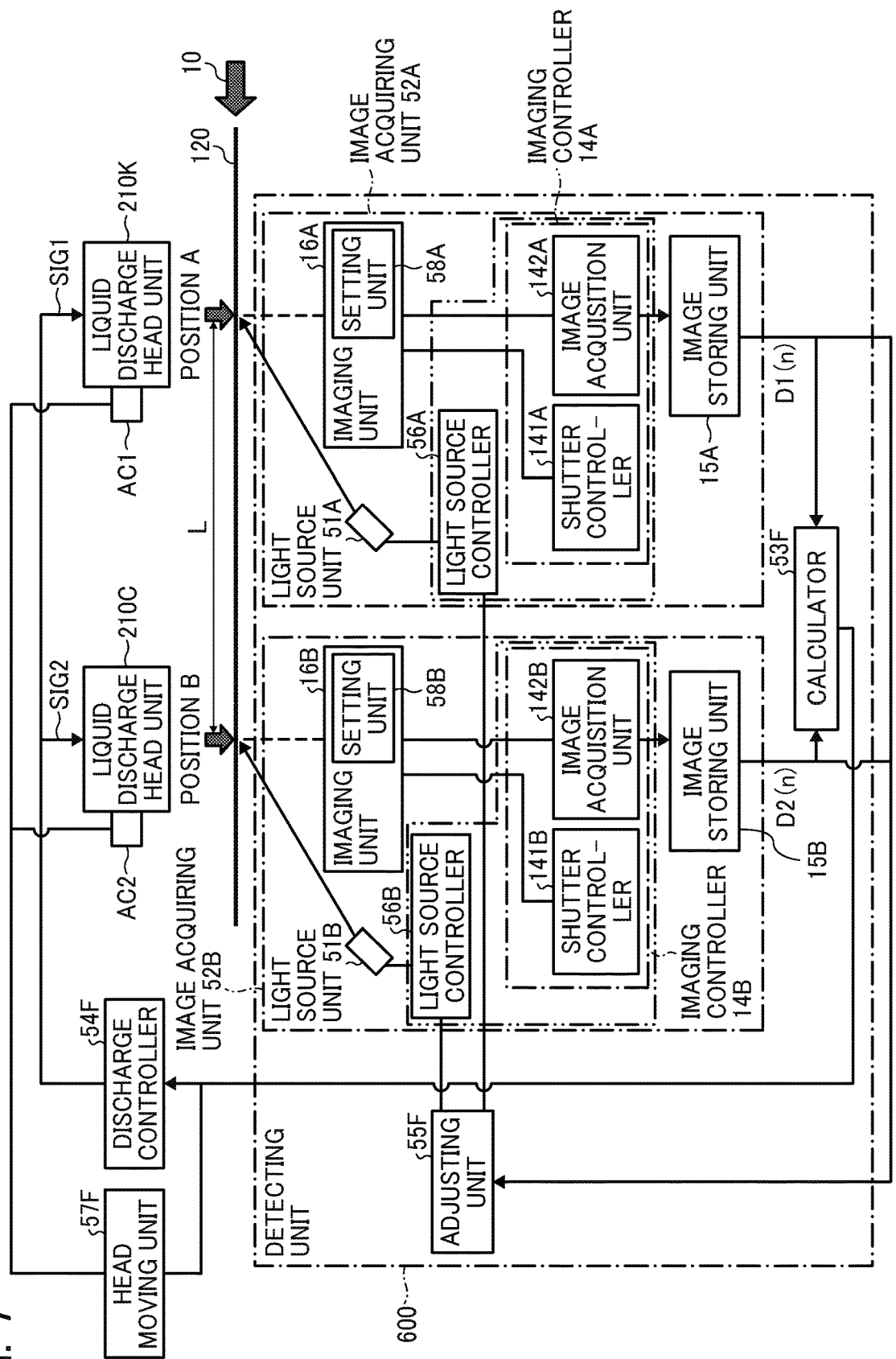
FIG. 7 is a schematic block diagram of a functional configuration of the detector according to the present disclosure.

The CMOS image sensor is an example of hardware that implements imaging units 16A and 16B illustrated in FIG. 7. In this example, the hardware for performing the correlation calculation is described as the controller 520. However, the correlation calculation may be executed by an FPGA circuit mounted on any one of the sensor devices SEN.

The control circuit 52 controls the optical sensor OS, the laser light source LG, and the like inside the sensor device SEN. Specifically, the control circuit 52 outputs trigger signals to the optical sensor OS to control shutter timing of the optical sensor OS, for example. The control circuit 52 causes the optical sensor OS to generate two-dimensional image data and acquires the two-dimensional images from the optical sensor OS.

Then, the control circuit 52 transmits the two-dimensional image data generated by the optical sensor OS to the memory device 53 or the like. Further, the control circuit 52 outputs a signal for controlling the light quantity to the laser light source 51 or the like. The control circuit 52 may be implemented by a FPGA circuit, for example.

The memory device 53 is a so-called memory, for example. The memory device 53 preferably has a configuration to divide the two-dimensional image data transmitted from the control circuit 52 and to store in different storage areas.

The controller 520 performs calculation using image data stored in the memory device 53 and the like. Further, the controller 520 includes a memory 521 to store a type of the object (web 120) adjusted in the past and an amount of light associated with the type of the object.

The control circuit 52 and the controller 520 are, for example, a central processing unit (CPU) or electronic circuits. Note that the control circuit 52, the memory device 53, and the controller 520 are not necessarily discrete devices. For example, the control circuit 52 and the controller 520 may be implemented by a single CPU.

FIG. 7 is a schematic block diagram of a functional configuration of the detector 600 according to the present disclosure. As illustrated in FIG. 7, the detector 600 detects the position of the web 120 and the like using a combination of the sensor device SENK installed for the head unit 210K for black and the sensor device SENC installed for the head unit 210C for cyan among the sensor devices SEN installed for each of the head units 210.

As illustrated in FIG. 7, the sensor device SENK for the head unit 210K for black includes an image acquiring unit 52A which functions as an image obtainer. The image acquiring unit 52A outputs image data imaged (captured) at "position A". The sensor device SENC for the head unit 210C for cyan includes an image acquiring unit 52B which functions as an image obtainer. The image acquiring unit 52B outputs image data imaged (captured) at "position B".

First, the image acquiring unit 52A for the head unit 210K for black includes, for example, an imaging unit 16A, an imaging controller 14A, an image storing unit 15A, light source unit 51A, and a light source controller 56A, for example. In this example, the image acquiring unit 52B for the head unit 210C for cyan has a similar configuration with the image acquiring unit 52A for the head unit 210K. Thus, the image acquiring unit 52B for the head unit 210C includes an imaging unit 16B, an imaging controller 14B, an image storing unit 15B, a light source unit 51B, a light source controller 56B, for example. In the following, the image acquiring unit 52A is described below as an example.

As illustrated in FIG. 7, the imaging unit 16A captures and images an image of the web 120 conveyed in the conveyance direction 10. The imaging unit 16A is implemented by, for example, the optical sensor OS as illustrated in FIG. 5, for example.

The imaging controller 14A includes a shutter controller 141A and an image acquisition unit 142A. The imaging controller 14A is implemented by, for example, the control circuit 52 as illustrated in FIG. 5, for example.

The image acquisition unit 142A acquires image data captured and imaged by the imaging unit 16A.

The shutter controller 141A controls the imaging unit 16A to control timing of capturing and imaging the web 120.

The image storing unit 15A stores the image data acquired by the imaging controller 14A. The image storing unit 15A is implemented by, for example, the memory device 53 illustrated in FIG. 5, for example.

The light source unit 51A irradiates light such as laser light to the web 120. The light source unit 51A is implemented by, for example, the light source LG as illustrated in FIG. 5, for example.

The light source controller 56A controls turning ON or turning OFF of the light source unit 51A and the amount of light irradiated from the light source unit 51A, for example. The light source controller 56A is implemented by, for example, the control circuit 52 as illustrated in FIG. 5, for example.

A calculator 53F calculates the position of the pattern on the web 120, a speed at which the web 120 moves (hereinafter "moving speed"), and an amount of movement of the web 120 (hereinafter "moving amount") based on the image data respectively stored in the image storing unit 15A and 15B.

Further, the calculator 53F outputs data on time difference Δt indicating the timing of shooting (shutter timing) the web 120 to the shutter controller 141A. Thus, the calculator 53F may instruct the shutter controller 141A and the shutter controller 141B to control the shutter timings to capture and image the image data indicating the position A and the image data indicating the position B, respectively, with the time difference Δt. The calculator 53F is implemented by, for example, the controller 520 as illustrated in FIG. 5, for example.

The web 120 has diffusiveness on a surface of the web 120 or in an interior of the web 120. Accordingly, when the web 120 is irradiated with the laser light from the light source unit 51A and the light source unit 51B, the reflected light is diffused. The diffuse reflection creates a pattern on the web 120. The pattern is made of spots called "speckle" (i.e., a speckle pattern). Thus, when the web 120 is imaged by the imaging unit 16A, an image data indicating the speckle pattern is obtained.

The detector 600 includes an adjusting unit 55F to control the light source controller 56A. Particularly, the amount of light received by the imaging unit 16A and 16B is different according to types of the object (web 120). For example, even when an identical amount of the laser light is irradiated to the object (web 120), the amount of the laser light reflected on a surface of a normal paper and a coated paper is different.

Therefore, the adjusting unit 55F controls the light source controller 56A and adjusts the light quantity of the light irradiated from each of the light source unit 51A and the light source unit 51B based on the image data captured and imaged by each imaging unit 16A and 16B. The calculator 53F and the adjusting unit 55F are implemented by, for example, the controller 520 as illustrated in FIG. 5, for example.

As described above, the detector 600 can detect the position of the speckle pattern on the web 120 from the image data, and the detector 600 can detect the position of the web 120. The speckle pattern is appeared by the laser light irradiated to the web 120. The laser light interferes by an uneven shape on the surface or interior of the web 120.

As the web 120 is conveyed, the speckle pattern on the web 120 is conveyed (moved) as well. Thus, when an identical speckle pattern on the web 120 is detected at different time points at the position A and the position B by the image acquiring units 52A and 52B, respectively, the calculator 53F of the image forming apparatus 110 can calculate the moving amount of the web 120 based on an amount of movement (hereinafter, "moving amount") of the identical speckle pattern on the web 120. In other words, the calculator 53F calculates the moving amount of the speckle pattern based on the detection of an identical speckle pattern at the position A (upstream side) and the position B (downstream side) by the image acquiring units 52A and 52B, respectively.

Thus, the calculator 53F can calculate the moving amount of the web 120 from the moving amount of the speckle pattern. Further, the calculator 53F converts the calculated moving amount into a moving amount per unit time. Thus, the calculator 53F can calculate the moving speed of the web 120.

As illustrated in FIG. 7, the imaging unit 16A and the imaging unit 16B is spaced apart with a predetermined interval in the conveyance direction 10. The imaging units 16A and 16B image (capture) images of the web 120 at the positions A and the position B, respectively. Thus, a first pattern imaged by the imaging unit 16A and the second pattern imaged by the imaging unit 16B are imaged at different position.

The shutter controllers 141A and 141B control the imaging units 16A and 16B to image the web 120 at an interval of time difference Δt. Specifically, based on the pattern represented by the image data generated by the imaging, the calculator 53F obtains the amount of movement of the web 120. The time difference Δt can be expressed by Formula 1 below, where V represents a conveyance speed (mm/s) in an ideal condition without displacement, and L represents a relative distance, which is the distance (mm) between the imaging unit 16A and the imaging unit 16B in the conveyance direction 10.

$$\Delta t = L/V;\quad\quad\quad\quad\text{Formula 1}$$

In Formula 1, a relative distance L is an interval between the sensor device SENK and the sensor device SENC. Thus, the relative distance can be determined by measuring the interval between the sensor device SENK and the sensor device SENC in advance.

Further, the calculator 53F performs a cross-correlation operation of image data "D1($n$)" imaged by the image acquiring unit 52A and image data "D2($n$)" imaged by the image acquiring unit 52B. Hereinafter, image data generated by the cross-correlation operation is referred to as "correlated image". For example, the calculator 53F calculates a displacement amount ΔD(n) based on the correlated image. The displacement amount ΔD(n) is an amount of displacement of the web 120.

For example, the cross-correlation operation is expressed by Formula 2 below.

$$D1*D2* = F-1[F[D1]\cdot F[D2]*]\quad\quad\text{Formula 2}$$

In Formula 2, "D1" represents image data "D1($n$)" of the image imaged at the position A by the image acquiring unit 52A. Similarly, in Formula 2, "D2" represents image data "D2($n$)" of the image imaged at the position B by the image acquiring unit 52B. In Formula 2, "F[ ]" represents Fourier transform, and "F−1[ ]" represents inverse Fourier transform. Further, "*" represents complex conjugate, and "✻" represents cross-correlation operation in above Formula 2.

As indicated in the Formula 2, when cross-correlation operation "D1✻D2" is performed on the image data D1 and D2, image data indicating the correlation image is obtained. When the image data D1 and D2 are two-dimensional image data, the image data representing the correlation image becomes two-dimensional image data. When the image data D1 and D2 are one-dimensional image data, the image data representing the correlation image becomes one-dimensional image data.

When a broad luminance distribution causes an error in the correlation image, phase only correlation may be used. For example, phase only correlation is expressed by Formula 3 below.

$$D1*D2* = F-1[P[F[D1]]\cdot P[F[D2]*]];\quad\quad\text{Formula 3}$$

In Formula 3, "P[ ]" represents taking only phase out of complex amplitude. Note that the amplitude is considered to be "1".

Thus, the calculator 53F can calculate the displacement amount ΔD(n) based on the correlation image even when the luminance distribution is relatively broad.

The correlation image indicates a correlation between the image data D1 and the image data D2. Specifically, as the match rate between the image data D1 and the image data D2 increases, a luminance indicating a sharp peak (so-called correlation peak) is output at a position close to a center of the correlation image. When the image data D1 matches the image data D2, the center of the correlation image and the position of the peak of the image data D1 match the center of the correlation image and the position of the peak of the image data D2.

The calculator 53F outputs information such as a difference in the positions between the image data D1 and D2 at the time difference Δt, the moving amount of the web 120, and the moving speed of the web, for example, based on the result of the correlation calculation. For example, the detector 600 can detect the moving amount of the web 120 in the orthogonal direction 20 between the image data D1 and the image data D2. The detector 600 may detect the moving speed instead of the moving amount. The calculator 53F can calculate the moving amount of the head unit 210C for cyan from the result of the correlation calculation.

The head moving unit 57F controls the actuator AC2 in FIGS. 3 and 7 to control the ink discharge position of the liquid based on a calculation result of the calculator 53F. The head moving unit 57F is constituted by, for example, an actuator controller CTL (CTL1 through CTL4 in FIG. 3). The function of the head moving unit 57F may be configured not only by the actuator controller CTL but also by the combination of the actuator controller CTL and the controller 520 in FIG. 5. Further, the function of the head moving unit 57F may be configured by the controller 520.

Further, the calculator 53F may also calculate a difference between the moving amount of the web 120 and a relative distance L in the conveyance direction 10. As illustrated in FIG. 7, the relative distance L is a distance between the imaging units 16A and 16B. Further, the calculator 53F may also calculate and detect the position of the web 120 in the conveyance direction 10 and the orthogonal direction 20 from the two-dimensional image data imaged by the imaging units 16A and 16B. Thus, the calculator 53F can reduce a cost of detecting the position of the web 120 in both directions of the conveyance direction 10 and the orthogonal direction 20. The present embodiment can also reduce numbers of the sensors and thus reduce a space for the detection.

The calculator 53F calculates a discharge timing of the head unit 210C for cyan based on the calculation of difference between the movement amount of the web 120 from an ideal distance (relative distance L). Based on this calculation result of the discharge timing by the calculator 53F, the discharge controller 54F controls the head unit 210C for cyan to discharge cyan ink from the head unit 210C.

The discharge controller 54F outputs a second signal SIG2 to control the discharge timing of the head unit 210C for cyan. When the discharge timing of the head unit 210K is calculated by the calculator 53F, the discharge controller 54F outputs a first signal SIG1 to the head unit 210K for black to control the discharge timing of the head unit 210K. The discharge controller 54F is implemented by, for example, the controller 520 as illustrated in FIG. 2 and the like.

The correlation calculation may be calculated as follows, for example.

Figure 8:
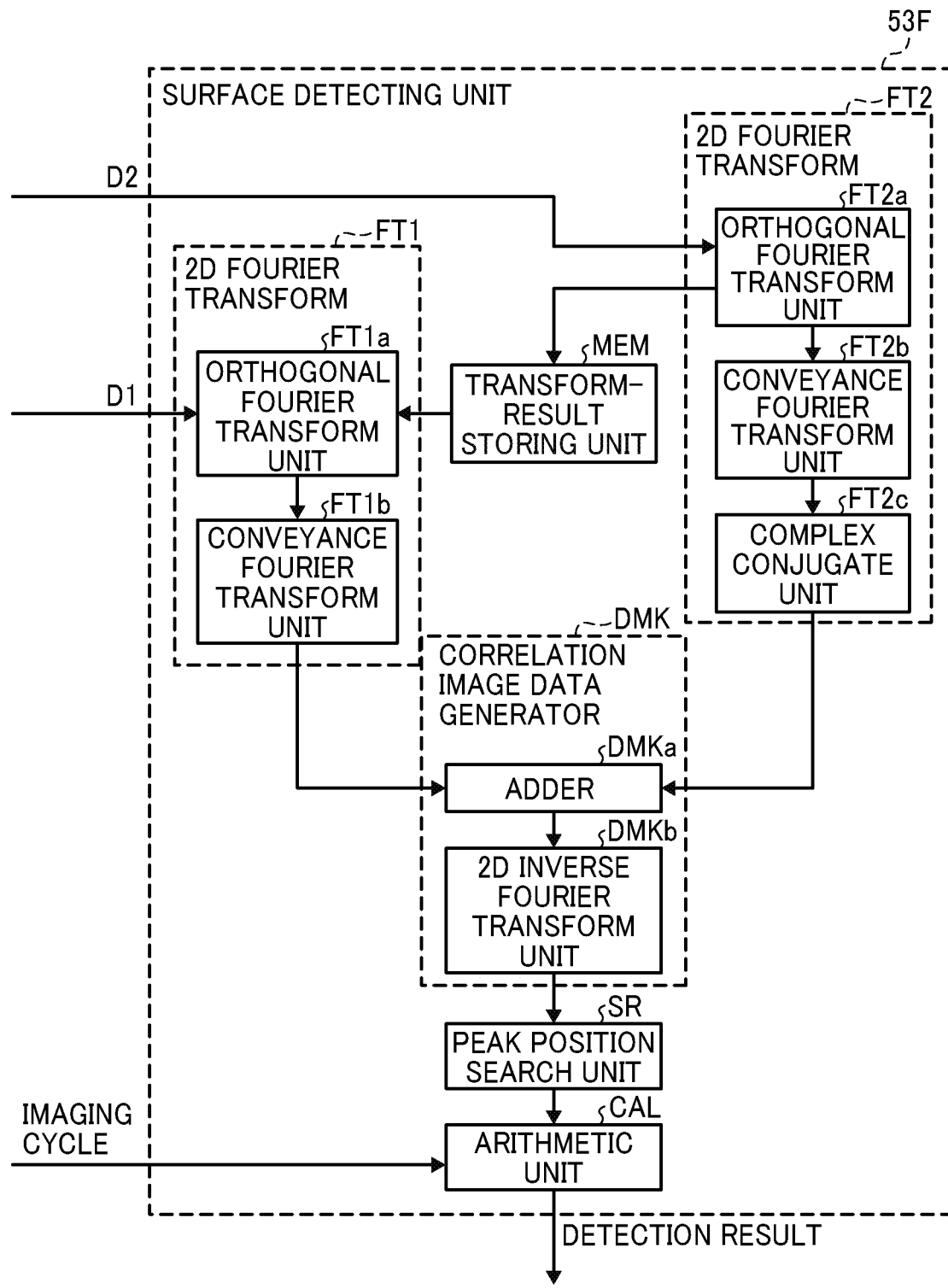
FIG. 8 is a block diagram of a calculator according to the present disclosure.

FIG. 8 is a block diagram of the calculator for executing a correlation calculation according to the present disclosure. For example, with a configuration as illustrated in FIG. 8, the calculator 53F can perform the correlation operation and calculate a relative position, the moving amount, the moving speed, or a combination of above of the web 120 in the orthogonal direction 20 at the positions A and B in which two or more image data are imaged by the imaging units 16A and 16B. The calculator 53F can also calculate the displacement amount ΔD(n) from an ideal conveyance position, the moving speed, for example, of the web 120 at the timing of imaging the two or more image data by the imaging units 16A and 16B.

Specifically, the calculator 53F includes a first 2D Fourier transform FT1, a second 2D Fourier transform FT2, a correlation image data generator DMK, a peak position search unit SR, an arithmetic unit CAL (or arithmetic logical unit), and a transform-result storing unit MEM.

The first 2D Fourier transform FT1 transforms the first image data D1. The first 2D Fourier transform FT1 includes a Fourier transform unit FT1a for transform in the orthogonal direction 20 and a Fourier transform unit FT1b for transform in the conveyance direction 10. Hereinafter, the Fourier transform unit FT1a for transforming in the orthogonal direction 20 is referred to as the "orthogonal Fourier transform unit FT1a". The Fourier transform unit FT1b for transforming in the conveyance direction 10 is referred to as the "conveyance Fourier transform unit FT1b".

The orthogonal Fourier transform unit FT1a performs one-dimensional transform of the first image data D1 in the orthogonal direction 20. Based on a result of transformation by the orthogonal Fourier transform unit FT1a, the conveyance Fourier transform unit FT1b performs one-dimensional transform of the first image data D1 in the conveyance direction 10. Thus, the orthogonal Fourier transform unit FT1a and the conveyance Fourier transform unit FT1b perform one-dimensional transform of the first image data D1 in the orthogonal direction 20 and the conveyance direction 10, respectively. The first 2D Fourier transform FT1 outputs the result of transformation to the correlation image data generator DMK.

Similarly, the second 2D Fourier transform FT2 transforms the second image data D2. Specifically, the second 2D Fourier transform FT2 includes a Fourier transform unit FT2a for transform in the orthogonal direction 20, a Fourier transform unit FT2b for transform in the conveyance direction 10, and a complex conjugate unit FT2c. Hereinafter, the Fourier transform unit FT2a for transforming in the orthogonal direction 20 is referred to as the "orthogonal Fourier transform unit FT2a". The Fourier transform unit FT2b for transforming in the conveyance direction 10 is referred to as the "conveyance Fourier transform unit FT2b".

The orthogonal Fourier transform unit FT2a performs one-dimensional Fourier transform of the second image data D2 in the orthogonal direction 20. Based on a result of transformation by the orthogonal Fourier transform unit FT2a, the conveyance Fourier transform unit FT2b performs one-dimensional transform of the second image data D2 in the conveyance direction 10. Thus, the orthogonal Fourier transform unit FT2a and the conveyance Fourier transform unit FT2b perform one-dimensional transform on the second image data D2 in the orthogonal direction 20 and the conveyance direction 10, respectively.

Next, the complex conjugate unit FT2c calculates a complex conjugate of the results of transformation by the orthogonal Fourier transform unit FT2a and the conveyance Fourier transform unit FT2b. Then, the second 2D Fourier transform FT2 outputs, to the correlation image data generator DMK, the complex conjugate calculated by the complex conjugate unit FT2c.

The correlation image data generator DMK then generates the correlation image data based on the result of transformation of the first image data D1 output from the first 2D Fourier transform FT1 and the result of transformation of the second image data D2 output from the second 2D Fourier transform FT2.

The correlation image data generator DMK includes an adder DMKa and a 2D inverse Fourier transform unit DMKb.

The adder DMKa adds the result of transformation of the first image data D1 to the result of transformation of the second image data D2, and outputs a result of addition to the 2D inverse Fourier transform unit DMKb.

The 2D inverse Fourier transform unit DMKb performs 2D inverse Fourier transform of the result generated by the adder DMKa. Thus, the correlation image data is generated through the 2D inverse Fourier transform performed by the 2D inverse Fourier transform unit DMKb. Then, the 2D inverse Fourier transform unit DMKb outputs the correlation image data to the peak position search unit SR.

The peak position search unit SR searches the correlation image data generated by the 2D inverse Fourier transform unit DMKb for a peak position (a peak of luminance value) at which rising of the luminance value is sharpest. First, values indicating the intensity of light, that is, the degree of luminance, are input to the peak position search unit SR as the correlation image data. Further, the luminance values are input to the peak position search unit SR in matrix form.

Here, the luminance values are arranged at a pixel pitch of the optical sensor OS (i.e., an area sensor), that is, pixel size intervals in the correlation image data. Thus, the peak position search unit SR preferably searches for the peak position after performing so-called sub-pixel processing. The sub-pixel processing enhances an accuracy in searching for the peak position. Thus, the calculator 53F can calculate and output the position, the moving amount, and the moving speed and the like to the discharge controller 54F.

For example, the peak position searching unit SR search for the peak position as described below.

Figure 9:
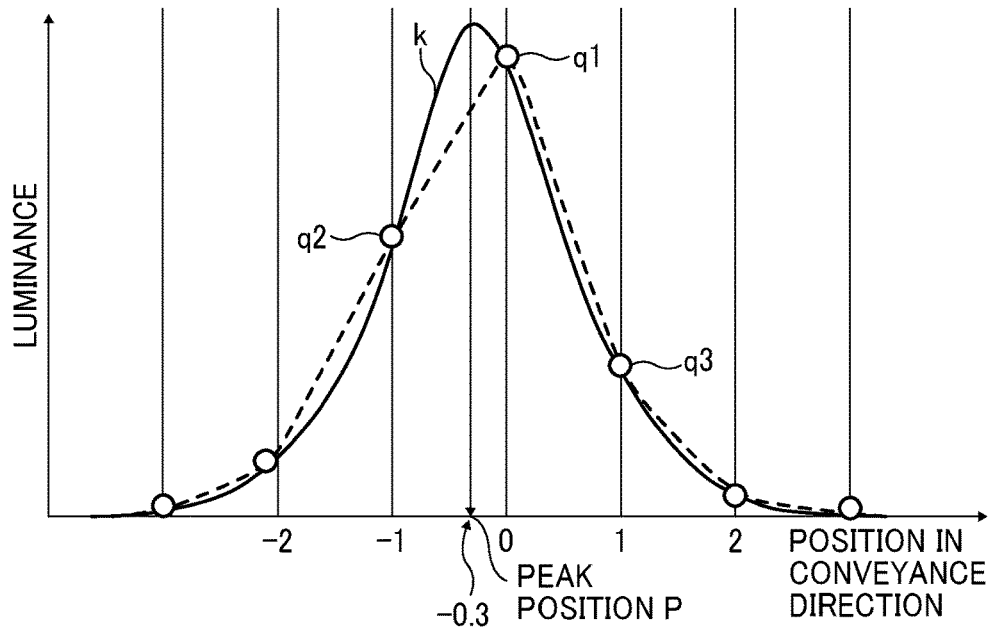
FIG. 9 is a graph illustrating a peak position according to the present disclosure.

FIG. 9 is a graph illustrating the peak position searched in the correlation operation according to the present embodiment. In FIG. 9, a lateral axis indicates a position of the image in the conveyance direction 10 in the correlation image data. A vertical axis in FIG. 9 indicates the luminance values of each pixel in the correlation image data.

The luminance values indicated by the correlation image data are described below using three data of a first data value q1, a second data value q2, and a third data value q3. In this example, the peak position search unit SR searches for the peak position P in a curved line k connecting the first, second, and third data values q1, q2, and q3.

First, the peak position search unit SR calculates difference in the luminance values of each pixel in the correlation image data. Then, the peak position search unit SR extracts a combination of data values in which a value of the difference becomes the largest among the calculated differences. Next, the peak position searching unit SR extracts combinations of luminance values adjacent to the combinations of data values with the largest difference value. In this way, the peak position searching unit SR can extract three data, such as the first data value q1, the second data value q2, and the third data value q3 as illustrated in FIG. 9.

The peak position search unit SR calculates the curved line k connecting these three data values q1, q2, and q3 and acquires the peak position P. Thus, the peak position search unit SR can reduce an amount of operations such as sub-pixel processing to increase a speed of searching for the peak position P. The peak position (a peak of luminance value) at which rising of the luminance value is sharpest is a position of the combination of data values in which a value of the difference becomes the largest. The manner of sub-pixel processing is not limited to the description above.

Through the searching of the peak position P performed by the peak position search unit SR, for example, the following result is attained.

Figure 10:
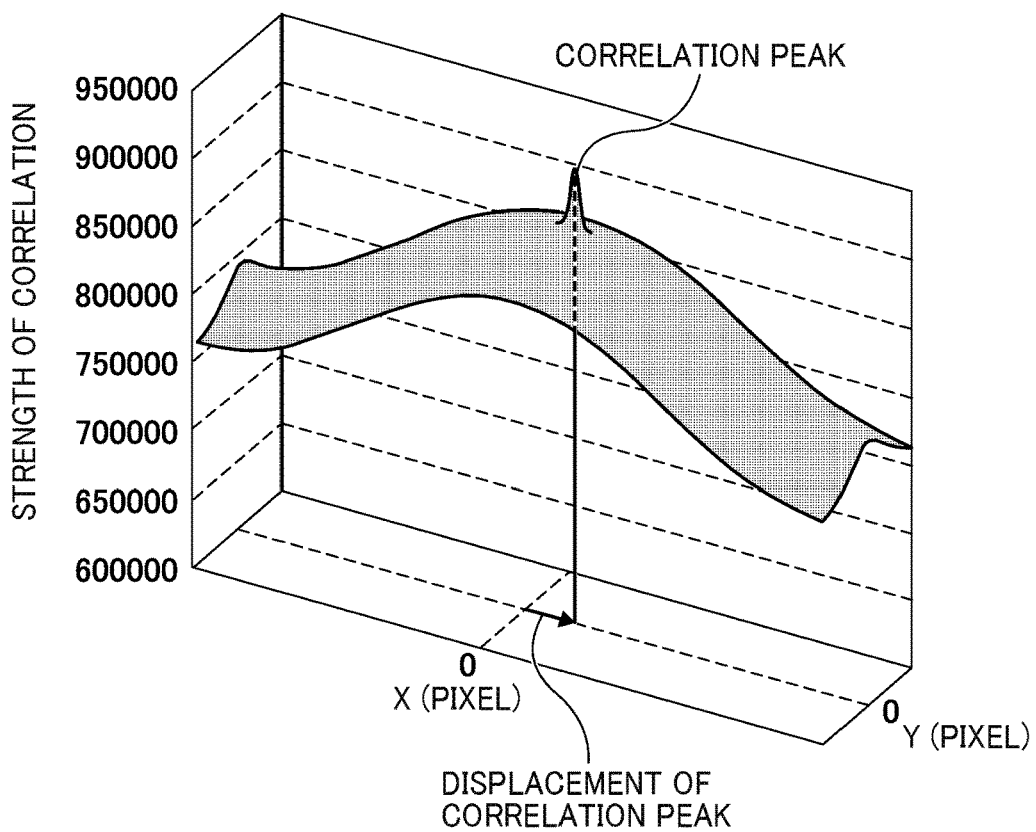
FIG. 10 is a graph illustrating a result of correlation operation according to the present disclosure.

FIG. 10 is a graph illustrating a result of correlation operation according to the present disclosure. FIG. 10 illustrates a profile of strength of correlation of a cross-correlation function. In FIG. 10, each of X-axis and Y-axis indicates serial numbers of pixels. The peak position search unit SR searches for a peak position such as "correlation peak" in FIG. 10. The strength of correlation illustrated in FIG. 10 indicates the strength of correlation in a condition in which a red laser light source is used, a light quantity is 60 mW, and a process of removing background noise is not performed.

The arithmetic unit CAL calculates the relative position, the moving amount, or the moving speed, or the combination of above of the web 120. For example, the arithmetic unit CAL calculates a difference between a center position of the correlation image data and the peak position calculated by the peak position search unit SR to acquire the relative position and the moving amount of the web 120.

Further, the arithmetic unit CAL divides the moving amount of the web 120 by time to acquire the moving speed.

Thus, the calculator 53F can calculate the relative position, the moving amount, the moving speed, or the like of the web 120 through the correlation operation. The method of calculation of the relative position, the moving amount, moving speed, or the like, is not limited to the method as described above. For example, the calculator 53F may alternatively acquire the relative position, the moving amount, the moving speed, or the like, through the method as described below.

First, the calculator 53F binarizes each luminance value of the first image data D1 and the second image data D2. That is, the calculator 53F binarizes the luminance value not greater than a predetermined threshold value into "0" and a luminance value greater than the threshold value into "1". Then, the calculator 53F may compare the binarized first and second image data D1 and D2 to acquire the relative position.

Although the above description concerns a case where fluctuations are present in Y-direction (orthogonal direction 20), the peak position may occur at a position displaced in X-direction (conveyance direction 10) when there is a fluctuation in the X direction.

Alternatively, the calculator 53F can adapt a different method to acquire the relative position, the moving amount, or the moving speed. For example, the calculator 53F can adapt so-called pattern matching process to detect the relative position from each of the speckle patterns in the image data.

Thus, the calculator can calculate the displacement amount ΔD(n) of the web 120 in the orthogonal direction 20 and the conveyance direction 10 through the correlation operation. The displacement amount ΔD(n) indicates how much the web 120 (object) is deviated from the predetermined position in the orthogonal direction 20 and the conveyance direction 10.

[Controller]

The configuration of the controller 520 (in FIG. 2), serving as the controller to control the head unit 210, is described below.

Figure 11:
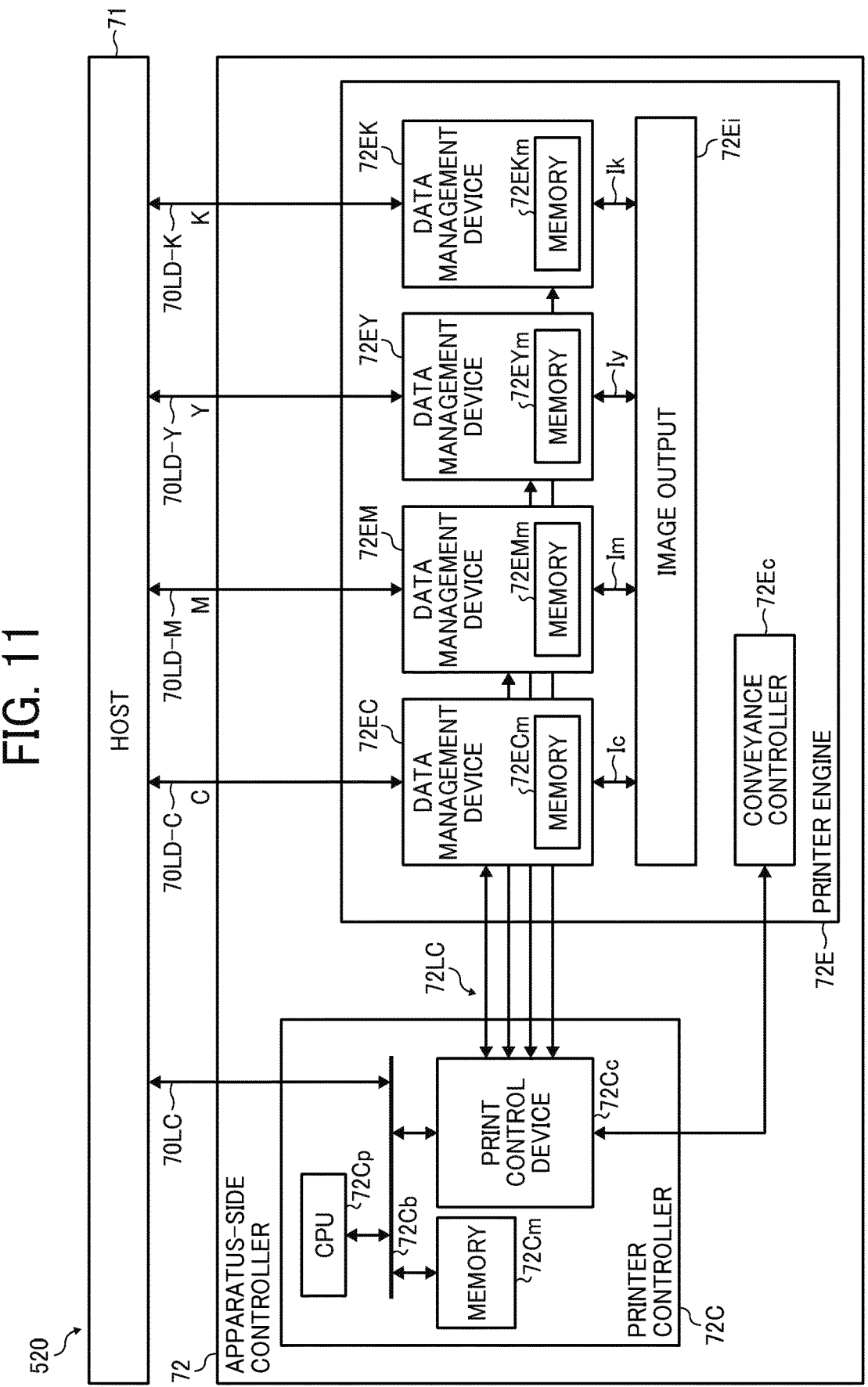
FIG. 11 is a schematic block diagram of a controller according to the present disclosure.

FIG. 11 is a schematic block diagram of a controller according to the present disclosure. For example, the controller 520 includes a host 71 (or a higher-order device), such as an information processing apparatus, and an apparatus-side controller 72. In the illustrated example, the controller 520 controls the apparatus-side controller 72 to form an image on a web 120 (object) according to image data and control data input from the host 71.

Examples of the host 71 include a client computer (personal computer or PC) and a server. The apparatus-side controller 72 includes a printer controller 72C and a printer engine 72E.

The printer controller 72C governs operation of the printer engine 72E. The printer controller 72C transmits and receives the control data to and from the host 71 via a control line 70LC. The printer controller 72C further transmits and receives the control data to and from the printer engine 72E via a control line 72LC. Through such data transmission and reception, the control data indicating printing conditions and the like are input to the printer controller 72C. The printer controller 72C stores the printing conditions, for example, in a register. The printer controller 72C then controls the printer engine 72E according to the control data to form an image based on print job data, that is, the control data.

The printer controller 72C includes a CPU 72Cp, a print control device 72Cc, and a memory 72Cm. The CPU 72Cp and the print control device 72Cc are connected to each other via a bus 72Cb to communicate with each other. The bus 72Cb is connected to the control line 70LC via a communication interface (I/F) or the like.

The CPU 72Cp controls the entire apparatus-side controller 72 based on a control program and the like. That is, the CPU 72Cp is a processor as well as a controller.

The print control device 72Cc transmits and receives data indicating a command or status to and from the printer engine 72E, based on the control data transmitted from the host 71. Thus, the print control device 72Cc controls the printer engine 72E.

To the printer engine 72E, a plurality of data lines, namely, data lines TOLD-C, TOLD-M, TOLD-Y, and TOLD-K are connected. The printer engine 72E receives the image data from the host 71 via the plurality of data lines TOLD-C, TOLD-M, TOLD-Y, and TOLD-K. Then, the printer engine 72E performs image formation of respective colors, controlled by the printer controller 72C.

The printer engine 72E includes a plurality of data management devices, namely, data management devices 72EC, 72EM, 72EY, and 72EK. The printer engine 72E includes an image output 72Ei and a conveyance controller 72Ec.

Figure 12:
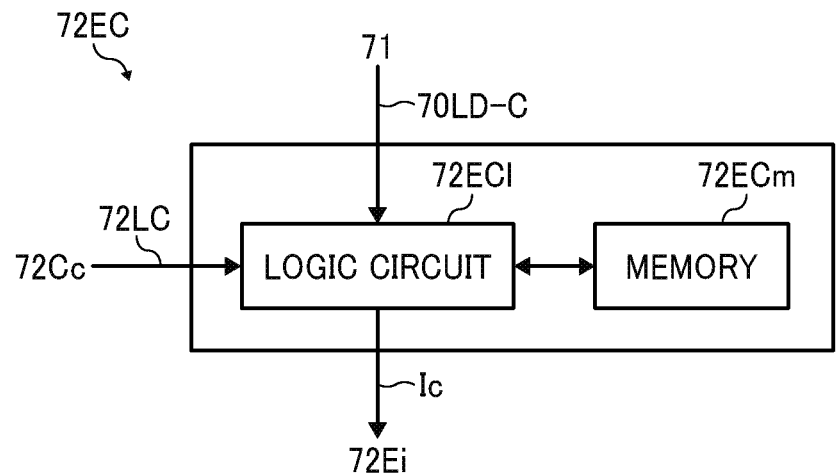
FIG. 12 is a block diagram of a configuration of a data management device.

FIG. 12 is a block diagram of a configuration of the data management device 72EC. For example, the plurality of data management devices 72EC, 72EM, 72EY, and 72EK may have an identical configuration, and the data management device 72EC is described below as a representative. Redundant descriptions are omitted.

The data management device 72EC includes a logic circuit 72EC1 and a memory 72ECm. As illustrated in FIG. 11, the logic circuit 72EC1 is connected to the host 71 via the data line TOLD-C. The logic circuit 72EC1 is connected to the print control device 72Cc via the control line 72LC. The logic circuit 72EC1 is implemented by, for example, an application specific integrated circuit (ASIC) or a programmable logic device (PLD).

According to a control signal input from the printer controller 72C, the logic circuit 72EC1 stores, in the memory 72ECm, the image data input from the host 71.

According to a control signal input from the printer controller 72C, the logic circuit 72EC1 retrieves, from the memory 72ECm, cyan image data Ic. The logic circuit 72EC1 then transmits the cyan image data Ic to the image output 72Ei.

The memory 72ECm preferably has a capacity for storing image data extending about three pages. With the capacity for storing image data extending about three pages, the memory 72ECm can store the image data input from the host 71, image data currently used in image formation, and image data for subsequent image formation.

Figure 13:
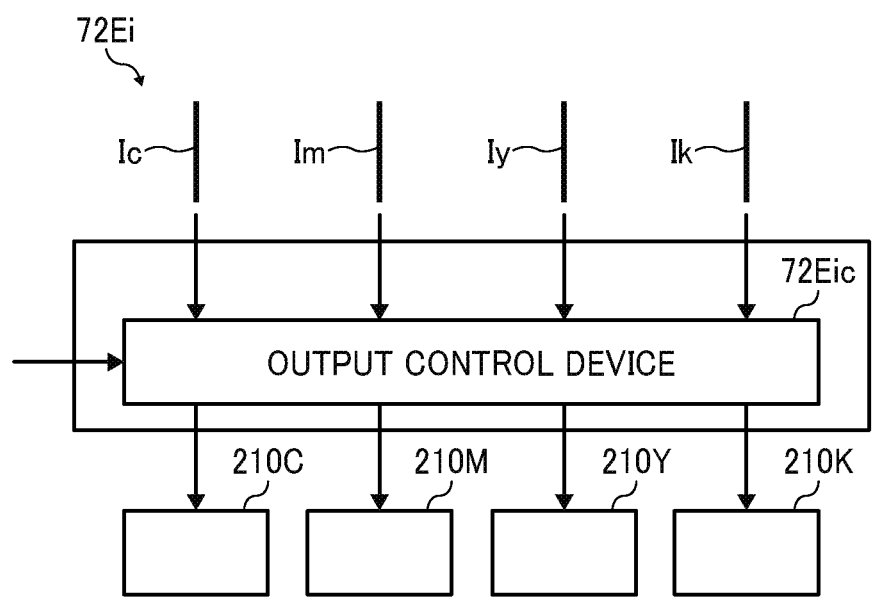
FIG. 13 is a block diagram of a hardware configuration of an image output device of the controller.

FIG. 13 is a block diagram of a configuration of the image output 72Ei. In FIG. 13, the image output 72Ei includes an output control device 72Eic and the head units 210K, 210Y, 210M, and 210C for respective colors of black, yellow, magenta, and cyan.

The output control device 72Eic outputs the image data for respective colors to the head units 210 for respective colors, respectively. That is, the output control device 72Eic controls the head units 210 for respective colors based on the image data input to the output control device 72Eic.

The output control device 72Eic controls the plurality of head units 210 either simultaneously or individually. Thus, the output control device 72Eic receives timing commands and changes the timings at which the head units 210 discharge respective color inks. The output control device 72Eic may control one or more of the head units 210 based on the control signal input from the printer controller 72C (illustrated in FIG. 11). Alternatively, the output control device 72Eic may control one or more of the head units 210 based on user instructions, for example.

In the example illustrated in FIG. 11, the apparatus-side controller 72 has different routes including a route for inputting the image data from the host 71 and a route for transmission and reception of the control data between the host 71 and the apparatus-side controller 72.

The conveyance controller 72Ec (in FIG. 11) includes a motor, a mechanism, and a driver for conveying the web 120. For example, the conveyance controller 72Ec controls the motor coupled to the rollers to convey the web 120.

[Example of Position Detection]

Figure 14:
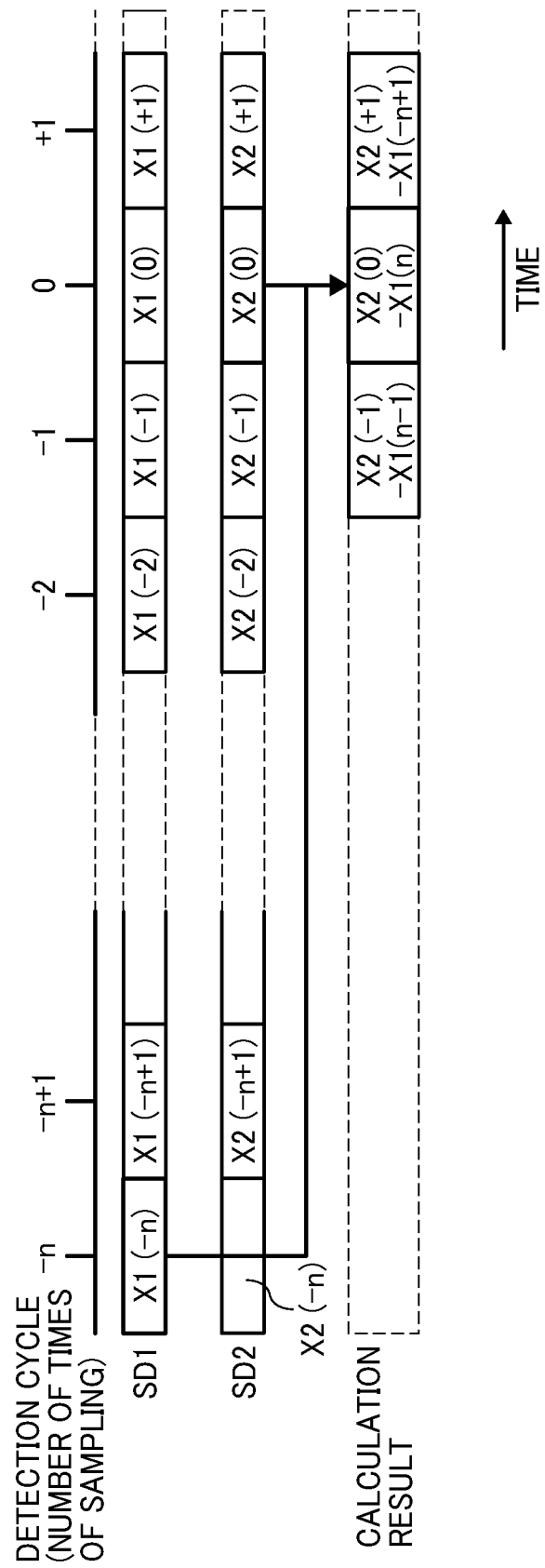
FIG. 14 is a timing chart of detecting the position of the web performed by the image forming apparatus according to the present disclosure.

FIG. 14 is a timing chart of detecting the position of the web 120 (object) performed by the image forming apparatus 110 according to the present disclosure.

The calculator 53F calculates an amount of displacement of the web 120 (object) in the conveyance direction 10 and the orthogonal direction 20 based on sensor data provided from the sensor devices SEN. Specifically, the calculator 53F outputs the result of calculated amount of displacement based on a first sensor data SD1 and a second sensor data SD2. In FIG. 14, an upstream sensor device SEN outputs a first sensor data SD1, and a downstream sensor device SEN outputs a second sensor data SD2.

The amount of displacement is calculated for each of the head units 210, for example. An example of calculation of the displacement of the web 120 for adjustment of the head unit 210K for black is described below. Here, the second sensor device SEN2 outputs the first sensor data SD1, and the sensor device SENK for black outputs the second sensor data SD2.

When "L2" represents the distance (interval) between the second sensor device SEN2 and the sensor device SENK for black, "V" represents a conveyance speed detected based of the sensor data, and "T2" represents a conveyance time for conveying the web 120 (object) from the second sensor device SEN2 to the sensor device SENK for black. Then, the conveyance time "T2" is calculated as "T2=L2/V".

Further, when "A" represents a sampling interval of the sensor devices SEN and "n" represents the number of times of sampling performed while the web 120 travels from the sensor device SENK to the sensor device SENC, the number of times of sampling "n" is calculated as "n=T2/A".

The calculation result is referred to as a displacement "AX". For example, when a detection cycle is "0", the displacement ΔX of the web 120 is calculated by comparing the first sensor data SD1 before the travel time "T2" with the second sensor data SD2 at the detection cycle "0". Specifically, the displacement ΔX is calculated as "ΔX=X2(0)−X1(n)".

Next, the head moving unit 57F controls the first actuator AC1 (see FIGS. 3 and 7) to move the head unit 210K for black in the orthogonal direction 20 to compensate for the displacement ΔX. With this operation, the image forming apparatus 110 can compensate for the displacement amount ΔX and accurately form an image on the web 120 (object) even when the position of the web 120 (object) changes in the orthogonal direction 20. Further, the displacement ΔX is calculated based on two sensor data SD1 and SD2 detected by sensor devices SEN2 and SENK, respectively. Then, the displacement ΔX may be calculated without integrating position data of each sensor devices SEN. Thus, this operation can reduce accumulation of detection errors by each of the sensor devices SEN.

The sensor device SEN to generate the sensor data SD1 is not limited to the sensor device SEN2 disposed next to and upstream from the sensor device SENK for the head unit 210K to be moved. That is, the sensor data SD1 may be generated by any of the sensor devices SEN disposed upstream from the head unit 210 to be moved. For example, any one of the second sensor device SEN2 and the sensor devices SENK and SENC can generate the first sensor data SD1 to calculate the displacement ΔX of the web 120 for adjusting the head unit 210Y for yellow to be moved.

On the other hand, the second sensor data SD2 is preferably generated by the sensor device SEN closest to the head unit 210 to be moved.

Alternatively, the displacement ΔX of the web 120 (object) may be calculated based on three or more detection results (sensor data).

The image forming apparatus 110 controls to move the head unit 210 and discharge the liquid onto the web 120 and form an image on the web 120 according to the displacement ΔX of the web 120 calculated based on a plurality of sensor data SD1 and SD2. Further, the image forming apparatus 110 can accurately discharge and land the liquid (ink) onto the web 120 (object) in the conveyance direction 10 by controlling the discharge timing of the head units 210 according to the displacement ΔX in the conveyance direction 10.

[Control of Process Timing]

Figure 15:
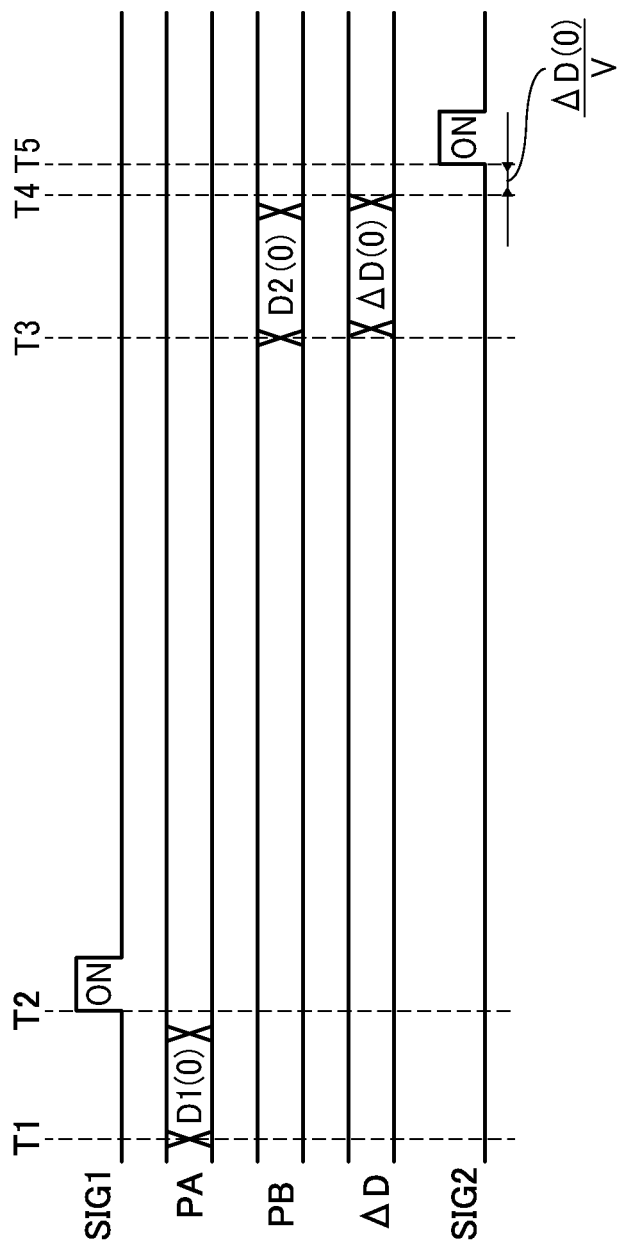
FIG. 15 is a timing chart of a process timing of the image forming apparatus according to the present disclosure.

FIG. 15 is a timing chart of a process timing of the image forming apparatus 110 according to the present disclosure. In FIG. 15, a first timing T1 is a detection timing at which the sensor device SENK for black performs detection. Similarly, a second timing T2 is a process timing at which the head unit 210K for black discharges black liquid (ink). Further, a third timing T3 is a detection timing at which the sensor device SENC for cyan performs detection.

As illustrated in FIG. 2, the sensor device SENC for cyan is disposed between the head unit 210K for black and the head unit 210C for cyan. Further, a fourth timing T4 is a process timing at which the head unit 210C for cyan discharges cyan liquid (ink). A fifth timing T5 is the processing timing at which the head unit 210C for cyan discharges the cyan liquid (ink) after adjustment of the adjusting unit 55F according to the detection results of the sensor device SENK and the sensor device SENC.

In this example, the position at which the sensor device SENC for cyan performs detection is hereinafter simply referred to as "detection position". Following assumption is made in the following example. The detection position is at a "distance D" from a position where the ink discharged from the head unit 210C for cyan lands. An installation interval between each sensor devices SEN is identical to an installation interval (relative distance L) between each head units 210. The web 120 moves at an ideal moving speed V. The ideal moving speed V is stored in the printer controller 72C (see FIG. 11).

First, the sensor device SENK for black acquires image data at a first timing T1, which is a timing earlier by D/V than the second timing T2 at which the head unit 210K for black discharges the black liquid (ink). In FIG. 15, the image data acquired at the first timing T1 is indicated by a first image signal "PA". This image data corresponds to the image data D1(n) acquired at the "position A" by the image acquiring unit 52A as illustrated in FIG. 7. Next, the image forming apparatus 110 turns "ON" a first signal SIG1 to control the head unit 210K to discharge the black liquid at the second timing T2.

Next, the imaging acquiring unit 52B of the image forming apparatus 110 acquires the image data at the third timing T3. In FIG. 15, the image data acquired at the third timing T3 is indicated by the second image signal PB, and this image data corresponds to the image data D2 (n) acquired at the "position B" as illustrated in FIG. 7. Next, the calculator 53F of the image forming apparatus 110 performs cross-correlation calculation on the image data D1 (n) and D2 (n). Thus, the calculator 53F of the image forming apparatus 110 can calculate the displacement amount ΔD(0). Then, the adjusting unit 55F controls the timing of turn "ON" the second signal SIG2 based on the displacement amount ΔD(0). The second signal SIG2 is the timing at which the head unit 210C for cyan discharges cyan liquid (ink)

When no thermal expansion occurs in a roller and no slippage occurs between the roller and the web 120, that is, in a so-called in an ideal state, it takes time "L/V" to convey a predetermined position of the web 120 for the relative distance L at the moving speed V for the image forming apparatus 110.

Thus, an "imaging cycle T" in which each imaging units 16A and 16B performs imaging (capturing) is set to be "imaging cycle T=imaging time difference=relative distance L/moving speed V" as an initial setting, for example. In FIG. 7, the optical sensors OS of the sensor device SENK for black and the sensor device SENC for cyan are installed at intervals of the relative distance L. In the ideal state, the predetermined position of the web 120 detected by the sensor device SENK for black is conveyed to the detection position of the sensor device SENC for cyan after the time "L/V".

Conversely, practically, the web 120 is often not conveyed with an ideal moving amount because of occurrence of the thermal expansion in the rollers and the slippage between the rollers and the web 120. In a method of the correlation calculation, when the relation of "imaging cycle T=relative distance L/movement speed V" is set, a time difference between the timing at which the image data D1(n) is imaged by the sensor device SENK for black and the timing at which the image data D2(n) is imaged by the sensor device SENC for cyan is calculated by "L/V". In this way, the image forming apparatus 110 may calculate the displacement amount ΔD(0) by using a result of calculation of "L/V" as the "imaging cycle T". A calculation of the displacement amount ΔD(0) is described below using the third timing T3 in FIG. 15 as an example.

At the third timing T3, the calculator 53F of the image forming apparatus 110 calculates the displacement amount ΔD (0) that is an example of the second distance. Then, the adjusting unit 55F of the image forming apparatus 110 controls the head unit 210C for cyan to change the process timing of discharging the cyan liquid (ink), that is, the timing of turning "ON" the second signal SIG2, based on the distance D, the displacement amount ΔD(0), and the moving speed V of the web 120.

First, the fourth timing T4 is determined based on the ideal state, that is, "L/V". Practically, the ink discharge position PC (see FIG. 2), on which the cyan liquid is discharged, is at a position displaced from the ink discharge position PC of the head unit 210C for cyan by the displacement amount ΔD(0) because of the thermal expansion of the roller and the like. Thus, it takes time "ΔD(0)/V" to convey the web 120 from the ink discharge position PC of the head unit 210C before adjustment to the ink discharge position PC of the head unit 210C after adjustment. Thus, the adjusting unit 55F of the image forming apparatus 110 controls the head unit 210C for cyan to change the process timing from the fourth timing T4 to the fifth timing T5 so that the liquid can be discharged onto the position adjusted by the displacement amount ΔD(0) from the ideal position.

The image forming apparatus 110 shifts the timing of turning "ON" the second signal SIG2 from the fourth timing T4 to the fifth timing T5 by "ΔD(0)/V". Thus, the image forming apparatus 110 changes the timing of discharging the liquid from the head unit 210 based on the displacement amount ΔD(0), the distance D, and the moving speed V, even if the thermal expansion occurs in the rollers and the like. Thus, the image forming apparatus 110 can improve the accuracy of the ink discharge position PC of the cyan liquid onto the web 120 in the conveyance direction 10.

Besides, an ideal moving speed may be preset for each mode in the controller 520 of the image forming apparatus 110. The ideal moving speed is obtained in a state without thermal expansion or the like.

Although the above example describes changing and determining the process timing, the image forming apparatus 110 may directly calculate the timing of discharging the liquid by the head unit 210 based on the displacement amount ΔD(0), the moving speed "V", and the distance "D".

[Overall Process]

Figure 16:
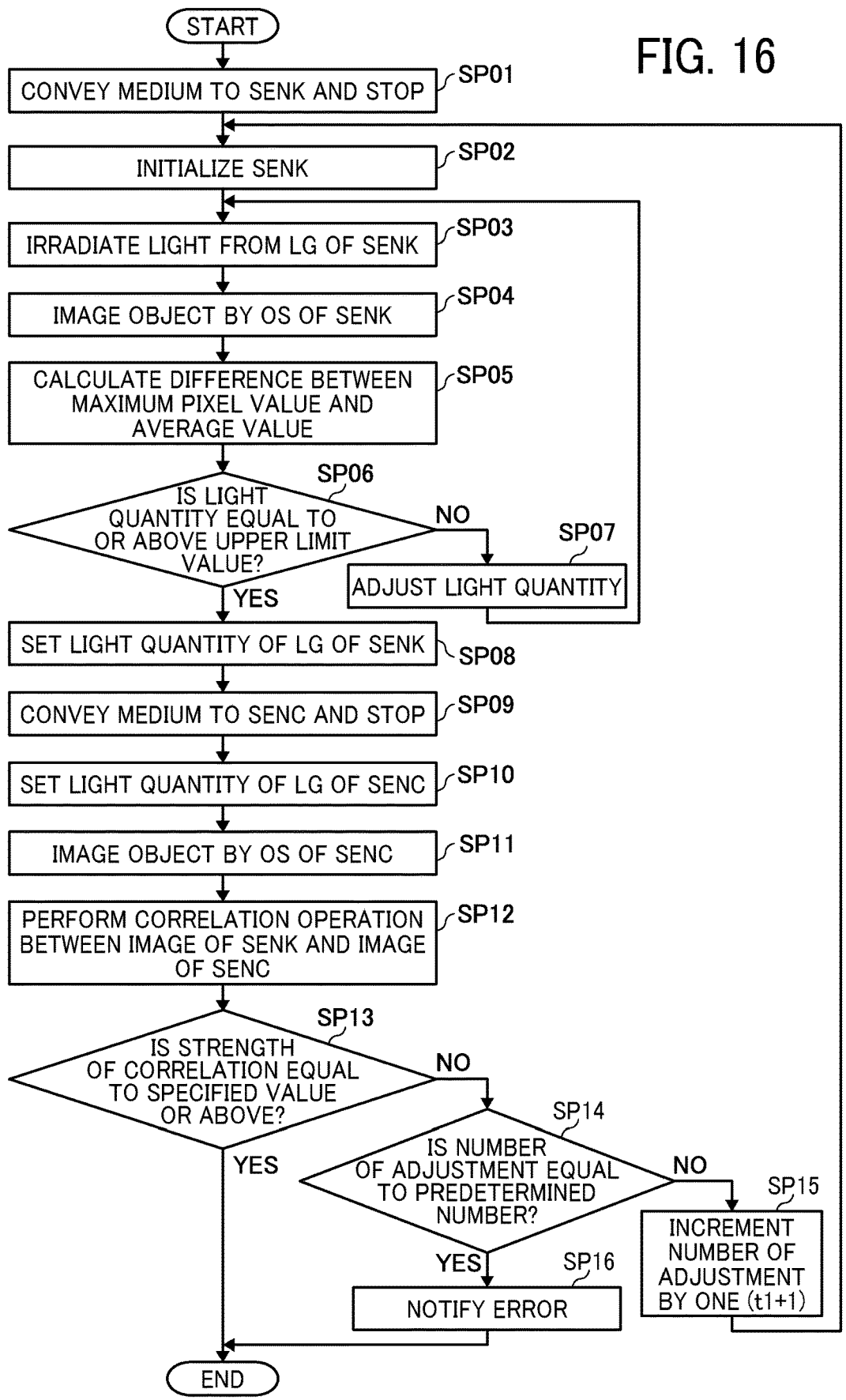
FIG. 16 is a flowchart of a process of adjustment of a light quantity by the detection device according to the present disclosure.

FIG. 16 is a flowchart of a process of adjustment of a light quantity by the detection device SEN according to the present disclosure. In this flowchart, an example in which the light quantity is adjusted using the sensor device SENK for black and the sensor device SENC for cyan is described.

In step SP01, the conveyance controller 72Ec (see FIG. 11) of the image forming apparatus 110 conveys the web 120 (object) to a detectable position where the sensor device SENK for black can detect the web 120. Preferably, the conveyance controller 72Ec conveys the web 120 to the detectable position and stops a conveyance of the web 120 at the detectable position to maximize difference. However, the controller 520 may detect the web 120 by the sensor device SENK for black while conveying the web 120 without stopping.

In step SP02, the control circuit 52 (see FIG. 5) of the sensor device SENK for black initializes the light quantity of the laser light source LG of the sensor device SENK for black under the control of the controller 520. For example, the control circuit 52 performs processes such as setting the light quantity irradiated by the laser light source LG to an initial value. Here, the initial value is set in advance by the user in the image forming apparatus 110. In an initialization process in step SP02, other set values and the like of the image forming apparatus 110 may be initialized. Hereinafter, an example is described in which the initial value of the light quantity is set to "30 mW" by the initialization process.

In step SP03, the control circuit 52 controls the laser light source LG and irradiates the web 120 (object) with light under the control of the controller 520. The light quantity irradiated by the laser light source LG is set by the initialization process (step SP02) or a process of adjustment of the light quantity (step SP07). Thus, the laser light source LG irradiates the web 120 (object) with light by the light quantity of 30 mW when the process is first reached to the step SP03.

In step SP04, the optical sensor OS of the sensor device SENK for black captures (images) the web 120 (object). In this manner, the optical sensor OS can generate image data indicating the speckle pattern appeared on the web 120 (object) when the sensor device SEN captures the web 120 (object). Further, the image data generated in this manner is used for controlling an imaging (capturing) condition of the light irradiated in step SP03.

In step SP05, the controller 520 calculates a difference between a maximum pixel value and an average value. The maximum pixel value is a pixel value having the largest value among the pixel values indicated by pixels distributed in a predetermined area in the image data generated in step SP04. The average value is a value obtained by averaging the other pixel values excluding the pixel having the maximum pixel value in the predetermined area of the image data. For example, the controller 520 of the image forming apparatus 110 first searches the maximum pixel value in the predetermined area in the image data. Next, the controller 520 calculates the average value of the other pixel values excluding the maximum pixel value.

Then, the controller 520 calculates a difference ΔPw between the maximum pixel value and the average value. Further, the controller 520 stores the difference ΔPw between the calculated maximum pixel value and the average value in the memory in the controller 520, for example, the memory 72Cm (see FIG. 11) in association with the emitted light quantity. The predetermined area is set in advance by the user in the image forming apparatus 110. Further, the image data generated in step SP04 is also stored in the memory 72Cm (see FIG. 12) in association with the emitted light quantity.

In step SP06, the controller 520 determines whether the emitted light quantity is equal to or above the upper limit value. Specifically, the upper limit value is set to "105 mW" for example. The upper limit value is an example of a predetermined value.

When the light quantity is not equal to or above the upper limit value (NO in step SP06), the controller 520 proceeds to step SP07.

In step SP07, the controller 520 controls the control circuit 52 (see FIG. 5) to increase the light quantity emitted from the laser light source LG. Specifically, when the light quantity is set to be raised for "+5 mW" beforehand, the controller 520 adjusts the light quantity, the initial value of which is "30 mW", to be "35 mW".

This process is repeated until the emitted light quantity becomes equal to or above the upper limit value in step SP06. Thus, the controller 520 increases the light quantity until the light quantity reaches the upper limit value ("105 mW" in this example) and stores the difference ΔPw between the maximum pixel value and the average value in association with the emitted light quantity in the memory 72Cm of the controller 520 (apparatus-side controller 72). Thus, the controller 520 stores the difference ΔPw in the memory 72Cm each time of adjustment of the light quantity.

Next, when the controller 520 determines that the light quantity is equal to or above the upper limit value (YES in step SP06), the controller 520 proceeds to step SP08.

In step SP08, the controller 520 compares a plurality of differences ΔPw stored in the memory 72Cm and specifies the difference ΔPw having the largest value (hereinafter referred to as "maximum difference"). Next, the controller 520 adjusts the light quantity to be equal to the light quantity associated with the maximum difference.

The larger the difference ΔPw is, the larger the difference between the maximum value and the average value becomes. A strength of the correlation peak tends to be large in the image data having larger difference ΔPw when the correlation is calculated. Thus, a clear correlation is easily obtained in the image data having larger difference ΔPw. Thus, the image forming apparatus 110 adjusts the light quantity of the laser light source SG to be the light quantity associated with the maximum difference. Thus, the image forming apparatus 110 can capture (image) the image data that facilitates searching for correlation peaks obtained by correlation calculation.

Next, in step SP09, the conveyance controller 72Ec conveys the web 120 to the position of the sensor device SENC for cyan.

In step SP10, the controller 520 controls the control circuit 52 of the sensor device SENC for cyan to set the light quantity to be substantially the same as the emitted light quantity of the sensor device SENK for black.

In step SP11, the optical sensor OS of the sensor device SENC for cyan can capture (image) image data indicating the speckle pattern of the object.

In step SP12, the controller 520 performs correlation calculation and the like. Specifically, the controller 520 performs the correlation calculation between the image data corresponding to set light quantity and the image data captured in step SP11, among the image data stored in the memory 72Cm in association with the light quantity in step SP05. For example, the controller 520 performs a correlation calculation as illustrated in FIG. 7.

In step SP13, the controller 520 determines whether the strength of the correlation peak is equal to or above a specified value. The specified value is set in advance by the user in the image forming apparatus 110. The controller 520 determines whether the result of the correlation calculation is obtained that allows accurate searching of the correlation peak. Specifically, the larger the strength of the correlation peak, the more the correlation peak is likely to be accurately searched. Thus, the controller 520 compares the strength of the correlation peak obtained by the correlation calculation in step SP12 with the specified value, and determines whether the strength of the correlation peak is equal to or above the specified value.

The controller 520 may determine whether the correlation peak is appeared within the predetermined area.

Next, when the controller 520 determines that the strength of the correlation peak is equal to or above the specified value (YES in step SP13), the controller 520 ends the process of adjusting the light quantity. Conversely, if the controller 520 determines that the intensity of the correlation peak is less than the specified value (NO in step SP13), the controller 520 determines whether a number of current adjustment equals the predetermined number of adjustment (SP14). When the number of current adjustment equals the predetermined number of adjustments (YES in step SP14), a control panel provided in the image forming apparatus 110 notifies an error (step SP16) because the laser light source LG is defective, for example.

When the number of current adjustment does not reach the predetermined number of adjustment (NO in step SP14), the controller 520 increments the number of adjustments by one (t1+1) (step SP15) and proceeds to step SP02. The user may arbitrarily set the predetermined number of adjustment for determining whether to notify the error. However, it is preferable to set the predetermined number of adjustment to three to maintain a process speed.

Then, the controller 520 calculates the relative position, the moving speed, the moving amount, or the combination above of the web 120 using the adjusted light quantity and controls the position of the head unit 210 and the timing of discharging the liquid by the head unit 210 until a next process flow illustrated in FIG. 16 is executed.

Comparative Example

Figure 17:
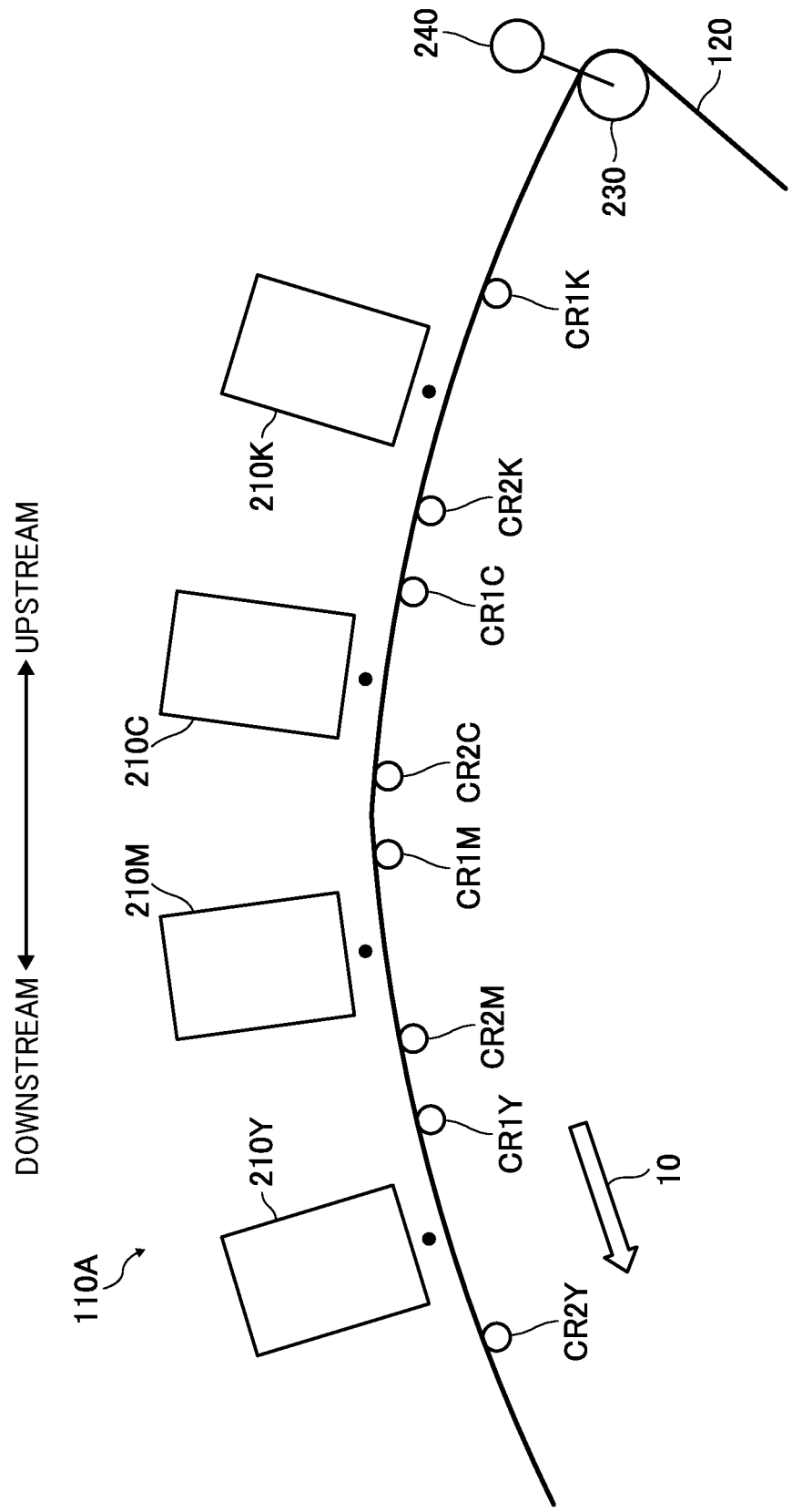
FIG. 17 is a schematic cross-sectional view of an image forming apparatus according to a comparative example.

FIG. 17 is a schematic cross-sectional view of an image forming apparatus 110A according to a comparative example. As illustrated in FIG. 17, the image forming apparatus 110A of the comparative example includes an encoder 240 on a roller 230 that conveys the web 120. Then, the image forming apparatus 110A of comparative example includes a plurality of liquid discharge head units 210K, 210C, 210M, and 210Y (hereinafter simply referred to as "head unit") each of which discharges respective colors of liquid based on an amount of movement of the web 120 measured by the encoder 240.

Figure 18:
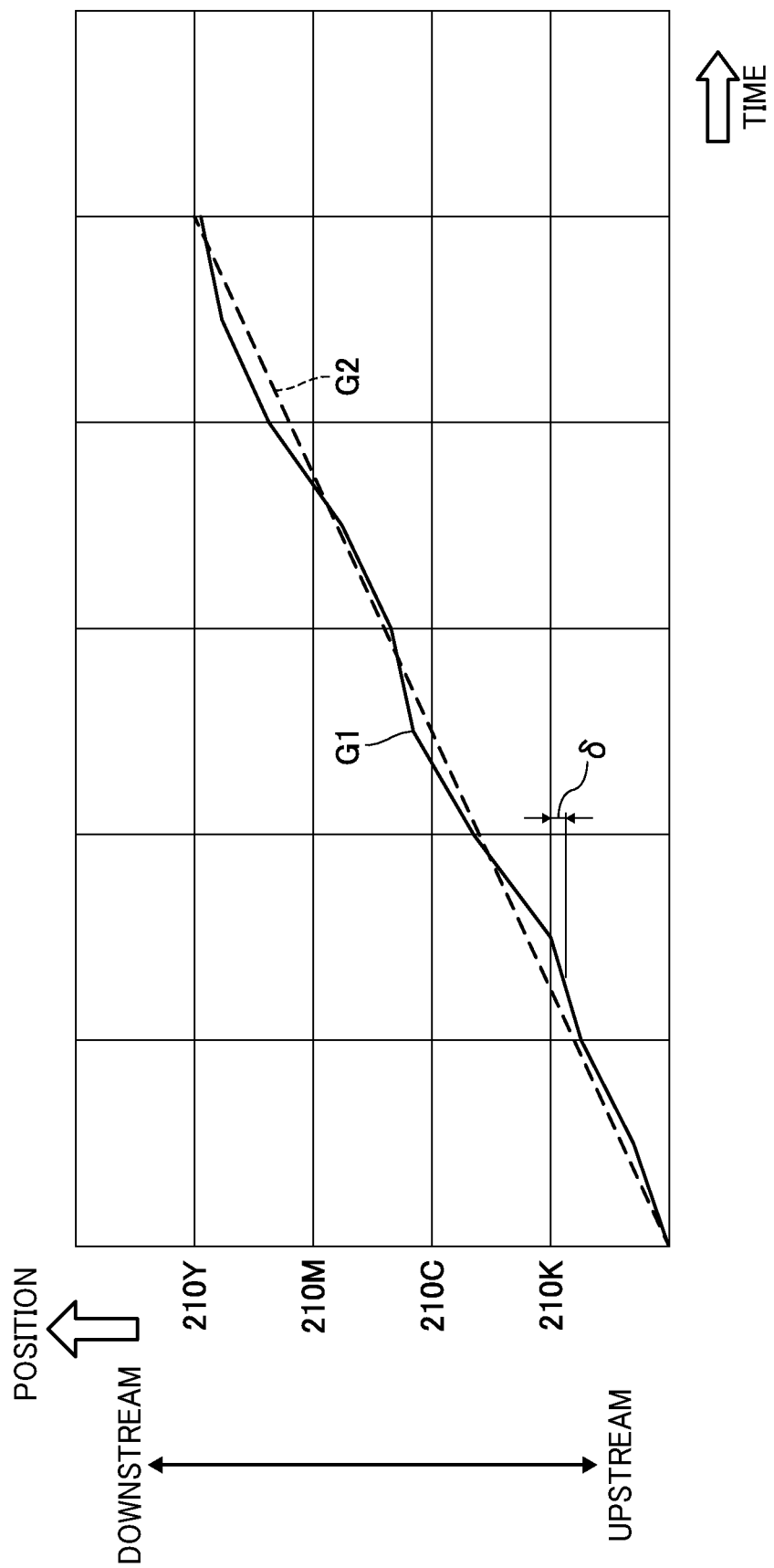
FIG. 18 is a graph illustrating an example of displacement in an ink discharge position when the ink lands on the web in a state without adjustment.

FIG. 18 is a graph illustrating an example of a displacement amount ΔD(n) in ink discharge position (ink landing position) PK, PC, PM and PY (see FIG. 2) when the ink discharged from the head units 210 lands on the web 120 in a state without adjustment by the image forming apparatus 110A of the comparative example.

A first graph G1 represents an actual position of the web 120. A second graph G2 represents a position of the web 120 calculated based on the encoder signal from the encoder 240. Thus, when the second graph G2 differs from the first graph G1, the actual position of the web 120 and the calculated position of the web 120 differs in the conveyance direction 10. Thus, the ink discharge position is likely to deviate.

Figure 19:
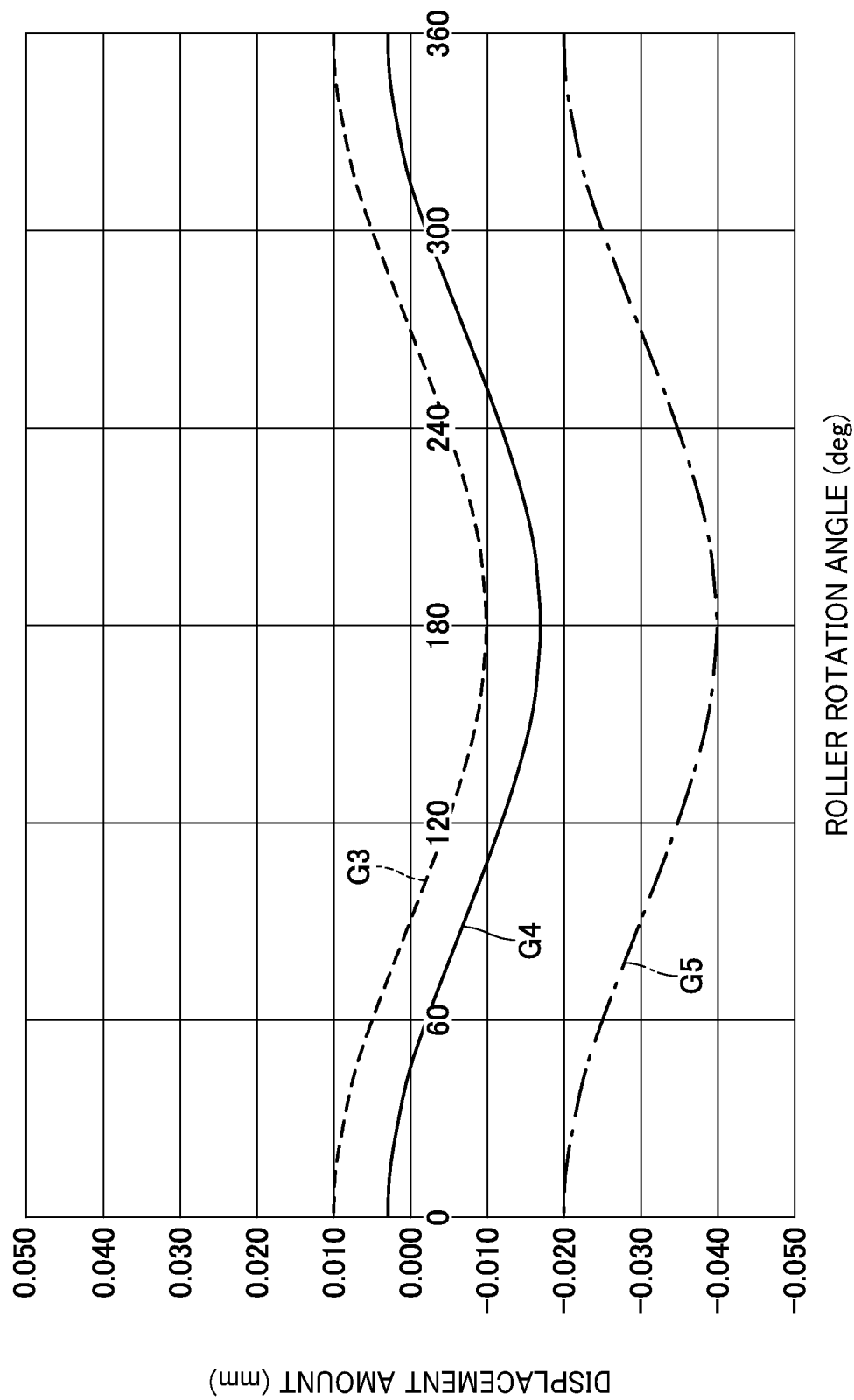
FIG. 19 is a graph illustrating an influence of the roller eccentricity on displacement in ink discharge position.

For example, the displacement amount δ is generated during the head unit 210K for black discharging the black liquid. Further, the displacement amount δ may be different for each of the head units 210. Thus, each of the displacement amount δ is often different from the displacement amount δ of the head unit 210K for black as illustrated in FIG. 19.

The displacement amount δ is generated, for example, by eccentricity of the roller, thermal expansion of the roller, slippage between the web 120 and the roller, an elongation and contraction of the web 120, and combinations of the above. The web 120 is an example of the object or a recording medium, FIG. 19 is a graph illustrating an influence of the roller eccentricity on displacements in ink discharge position. The graphs illustrated in FIG. 19 indicates one of an example of the influence of the thermal expansion of the roller, the eccentricity of the roller, and slippage between the roller and the web 120 on the displacement in ink discharge position. Each graph in FIG. 19 illustrates the displacement amount in a vertical axis that represents a difference between the position of the web 120 calculated based on the encoder signal from the encoder 240 and the actual position of the web 120. In this example, the roller has an outer diameter of 60 mm and is made of aluminum.

The third graph G3 illustrates the displacement amount when the roller has an amount of eccentricity of "0.01 mm". As indicated by the third graph G3, a period of displacement amount due to eccentricity of the roller is often synchronized with a period of rotation of the roller. Further, the displacement amount due to eccentricity is often proportional to an amount of eccentricity. However, the displacement amount is not accumulated in many cases.

A fourth graph G4 indicates the displacement amount when there is an eccentricity and a thermal expansion in the roller. Note that the thermal expansion is under a temperature change of −10° C.

A fifth graph G5 indicates the displacement amount when there is an eccentricity in the roller and a slippage between the web 120 and the roller. In this example, the slippage between the web 120 and the roller is "0.1 percent".

There is a case in which the web 120 is tensioned in the conveyance direction 10 to reduce meandering of the web 120 during conveyance of the web 120. This tension on the web 120 may cause expansion and shrinkage of the web 120. The degree of expansion and shrinkage of the web 120 may vary depending on a thickness, width, amount of liquid applied to the web 120, or the like.

[Example of Processing Result]

Figure 20:
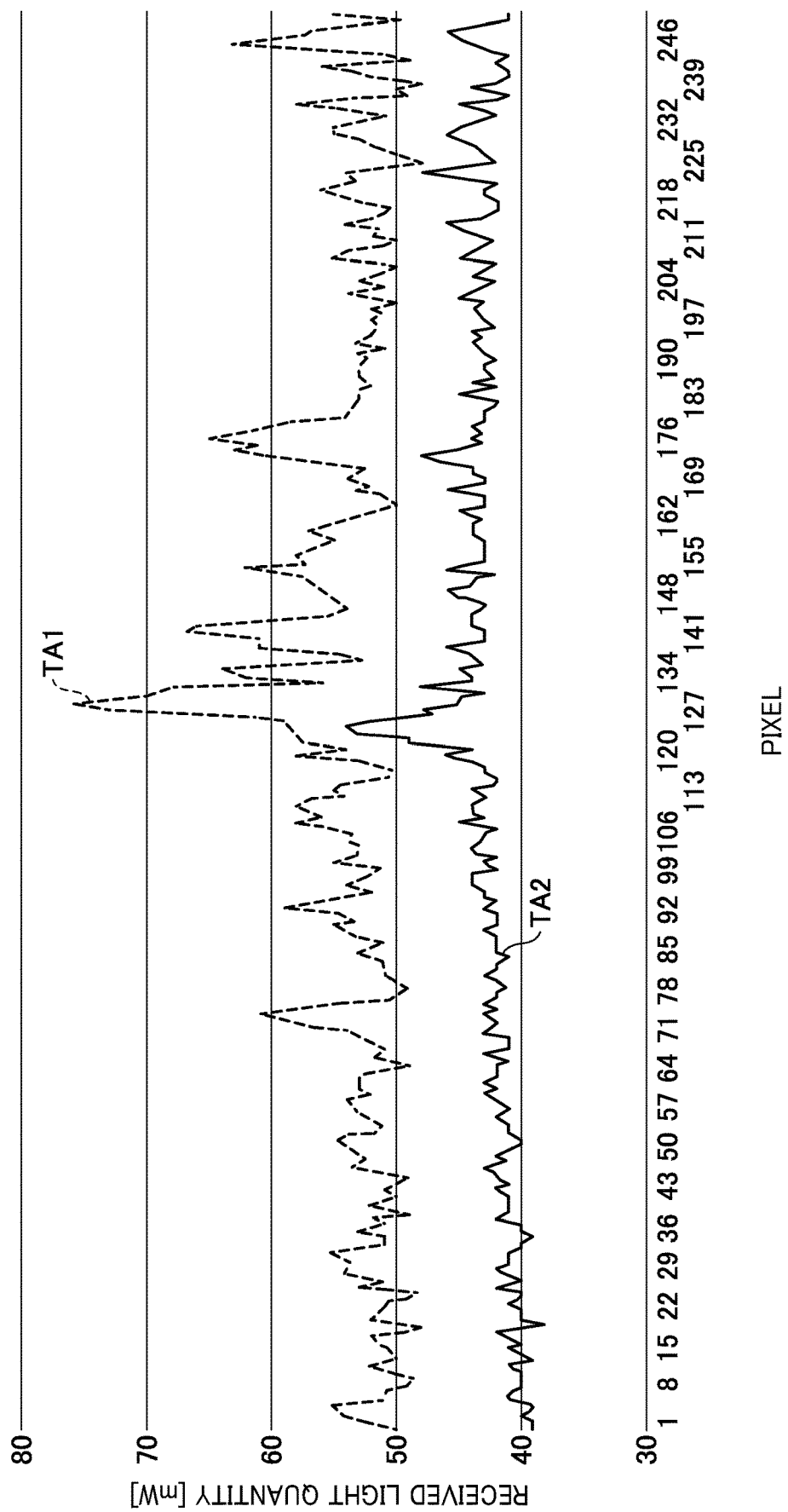
FIG. 20 is a graph illustrating an example of an experimental result for each object according to a present disclosure.

FIG. 20 is a graph illustrating an example of an experimental result for each object according to a present disclosure. FIG. 20 illustrates the experimental results when two different types of objects are irradiated with light of identical light quantity to generate the image data. In FIG. 20, the horizontal axis indicates a number to specify the pixels of the image data. In FIG. 20, the number of the pixels is from "1" to "250" since a total number of pixels is 250. The vertical axis indicates the light quantity received by each pixel. With an increase in the received light quantity, the pixel value increases in proportion to the received light quantity.

FIG. 20 illustrates cases in which the types of the object are a plain paper TA2 and an offset coated paper TA1. As illustrated in FIG. 20, the received light quantity differs according to the type of the object. Specifically, when the material of the object has a high smoothness like the offset coated paper TA1, the received light quantity tends to be larger than the received light quantity of the plain paper TA2 or the like.

Even in an imaging condition in which the same light quantity is irradiated on the object, the result of the correlation calculation performed based on the image data of object differs if the type of the object is different.

Figure 21:
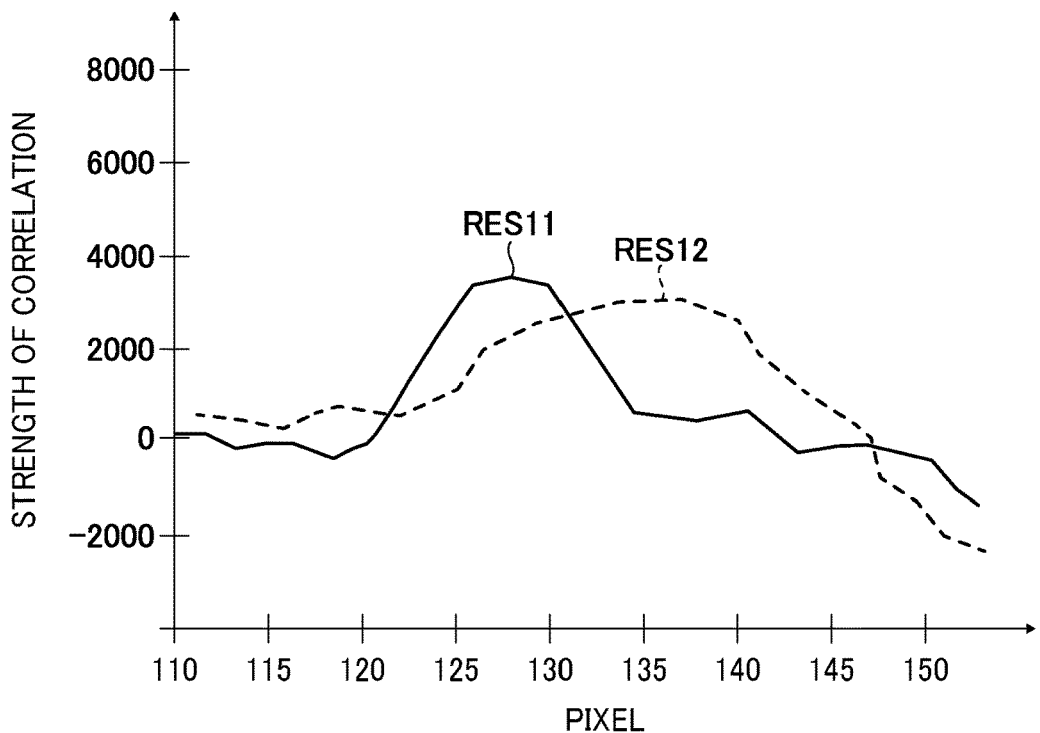
FIG. 21 is a graph illustrating an example of an experimental result when the object is a plain paper according to a present disclosure.
Figure 22:
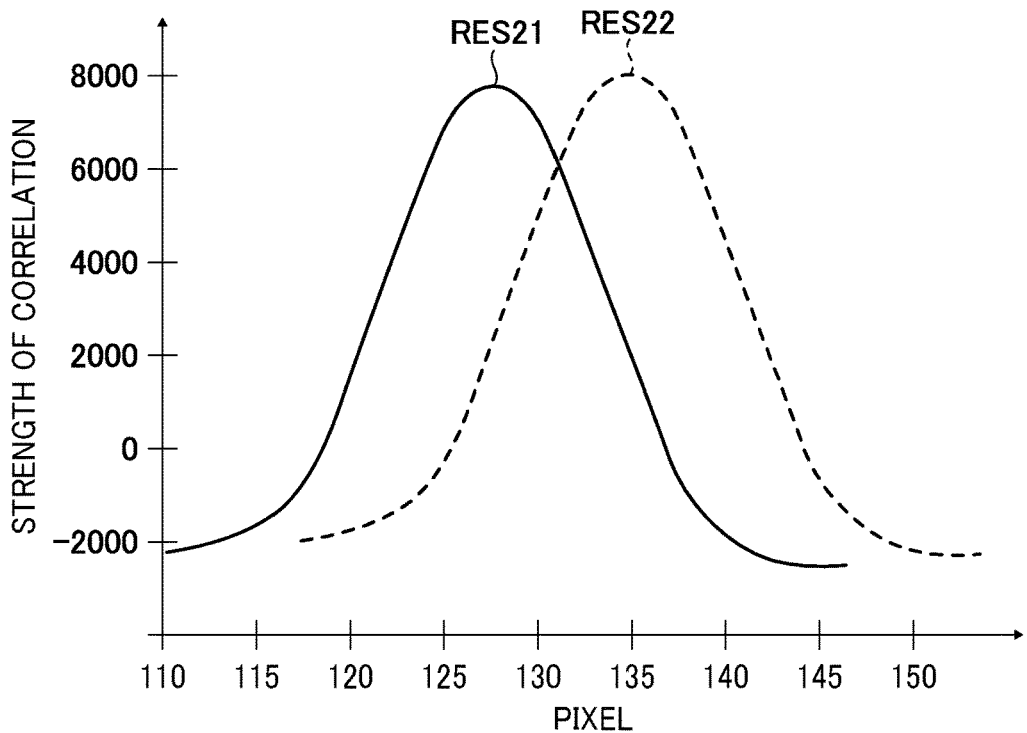
FIG. 22 is a graph illustrating an example of an experimental result when the object is a coated paper according to a present disclosure.
Figure 24:
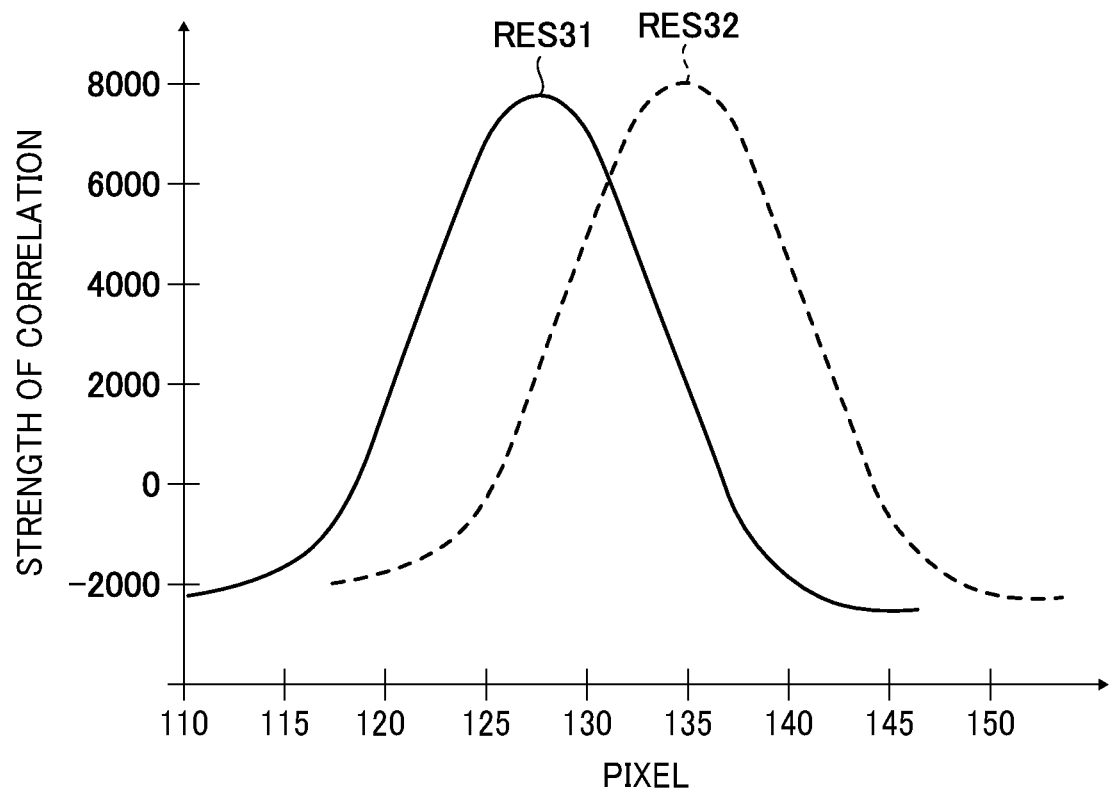
FIG. 24 is a graph illustrating a result of an adjustment by the detector according to the present disclosure.

FIG. 21 is a graph illustrating an example of an experiment result when the object is a plain paper according to a present disclosure. In FIG. 21, the horizontal axis indicates the number to specify the pixels of the image data as in FIG. 20. The vertical axis indicates the strength of correlation. Hereinafter, the strength of correlation in FIGS. 21, 22, and 24 illustrate the strength of correlation when a white LED light source was used, the light quantity was 30 mW, and a process of a background noise removal is performed. Also, in FIG. 21, the result of the correlation calculation in the orthogonal direction 20 is indicated by an experiment result "RES11". Furthermore, in FIG. 21, the result of the correlation calculation in the conveyance direction 10 is indicated by the experiment result "RES12".

FIG. 22 is a graph illustrating an example of an experimental result when the object is a coated paper according to a present disclosure. The horizontal axis and the vertical axis are the same as in FIG. 21. In FIG. 22, the result of the correlation calculation in the orthogonal direction 20 is indicated by an experiment result "RES21". In FIG. 22, the result of the correlation operation in the conveyance direction 10 is indicated by an experiment result "RES22".

As illustrated in FIGS. 21 and 22, when comparing FIG. 21 and FIG. 22, the strength of the correlation peak differs even under the same imaging (capturing) condition. Specifically, the light quantities received in the experiment results RES11 and RES12 are small in FIG. 20. Thus, a sensitivity when the correlation calculation is performed tends to be low. That is, the strength of the correlation peak becomes small in the experiment results RES11 and RES12 since the difference between the strength of correlation at the peak and the strength of correlation other than the peak is small.

Further, when comparing a waveform between FIG. 21 and FIG. 22, there is distortion in the waveform of the experiment results RES11 and RES12 in FIG. 21. Thus, a detection error by repetition (repetitive detection error) tends to increase in the experiment results RES11 and RES12. The repetitive detection error is a variation in measured values when the values are repeatedly measured at the same position. Further, the difference between the maximum pixel value and the average pixel value tends to be small. Thus, a difference of distribution of the strength of correlation between the peak position and the background is small. Thus, it is likely that the peak position may not be specified in the distribution of the strength of correlation.

As illustrated in FIG. 22, the light quantity received in the experiment results RES21 and RES22 are larger than the light quantity received in the experiment results RES11 and RES12 in FIG. 21. Thus, the sensitivity when correlation calculation is performed tends to be high in the experiment results RES21 and RES22. The difference between the strength of correlation at the peak and the strength of correlation other than the peak is large in the experiment results RES21 and RES22.

Thus, the strength of the correlation peak becomes large in the experiment results RES21 and RES22. Thus, the detection error by repetition (repetitive detection error) tends to be small in the experiment results RES21 and RES22 because the waveform has a shape close to a normal distribution. Further, a margin for erroneous detection tends to be sufficiently large since the difference between the maximum pixel value and the average pixel value tends to be large.

The above experiment results are obtained by performing the process from step SP03 to step SP05 in FIG. 16, for example.

Thus, as illustrated in FIG. 22, if the difference between the peak value and the other values is large, the strength of the correlation peak becomes large. Thus, an accurate detection result can be easily obtained. Conversely, the strength of the correlation peak tends to be small in a state as illustrated in FIG. 21. Thus, the detector 600 adjusts the light quantity by the step SP07 in FIG. 16, for example, as described below.

Figure 23:
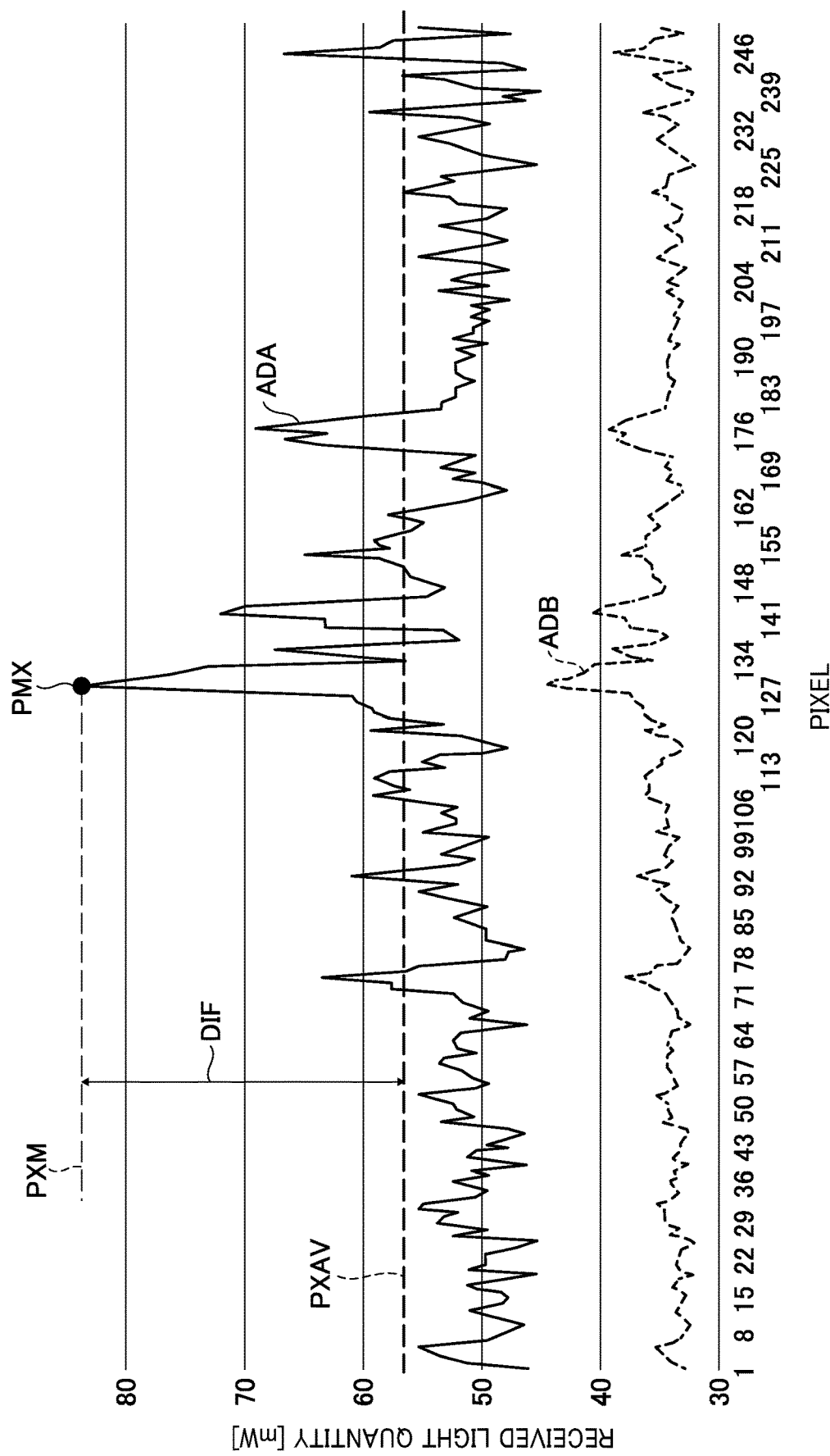
FIG. 23 is a graph illustrating a result of an adjustment by the detector according to the present disclosure.

FIG. 23 is a graph illustrating a result of an adjustment by the detector 600 according to the present disclosure. The horizontal axis and the vertical axis are the same as in FIG. 20. Hereinafter, it is assumed that the type of the object is plain paper.

An experiment result ADB before the adjustment is performed is illustrated in FIG. 23. The experiment result ADB is obtained under an imaging condition in which the web 120 is irradiated with a laser light, a light quantity of which is set as initialized condition, for example. Thus, the experiment result ADB is obtained (captured) under the imaging condition similar to the imaging condition in FIG. 20 for plain paper TA1.

Further, an experiment result ADA after the adjustment is performed is illustrated in FIG. 23. The experiment result ADA is obtained under an imaging condition in which the web 120 is irradiated with a laser light, a light quantity of which is adjusted such as by the steps SP08 and SP10 as illustrated in FIG. 16. As illustrated in FIG. 23, when the adjustment is performed, a difference DIF between a maximum pixel value PXM and the average pixel value PXAV of the experiment result ADA becomes larger than the difference DIF of the experiment result ADB.

Specifically, as illustrated in FIG. 23, a point having the largest pixel value among the pixel values is the peak point PMX. The average pixel value PXAV is a value obtained by averaging the respective pixel values of the pixels other than the pixel of the peak point PMX.

Thus, the detector 600 preferably adjusts the imaging condition (light quantity) by changing the imaging condition so that the difference DIF becomes the maximum. The maximum difference DIF is chosen among a plurality of differences DIF calculated based on the image data captured under each imaging conditions. In this way, the detector 600 can set the imaging condition in which the difference DIF becomes the largest among the imaging conditions settable by the detector 600 by the adjustment. The detector 600 may set the imaging condition such that the difference DIF equals to 80% or more of the largest value of the difference DIF.

Results of the adjustment as described below can be obtained by the above described correlation calculation.

FIG. 24 is a graph illustrating a result of an adjustment by the detector 600 according to the present disclosure. The horizontal axis and the vertical axis are the same as in FIG. 21. FIG. 24 illustrates the result of performing the correlation calculation on the captured image data after the adjustment as illustrated in FIG. 23.

As in FIG. 21 and the like, FIG. 24 illustrates the result of the correlation calculation in the orthogonal direction 20 indicated by an experiment result "RES31". Further, in FIG. 24, the result of the correlation operation in the conveyance direction 10 is indicated by an experiment result "RES32".

The detector 600 can easily search correlation peaks if an experiment result is similar to the experiment results RES31 and RES32. The waveforms illustrated in FIG. 24 have a shape close to the normal distribution. Thus, the repetitive detection error tends to be small in the experiment results RES31 and RES32. Further, a margin for erroneous detection tends to be sufficiently large since the difference between the maximum pixel value and the average pixel value tends to be large.

If the light quantity irradiated to the web 120 (object) is too large, the received light quantity may reach the upper limit value in some cases. In such a case, the difference DIF may become small. Thus, it is preferable to set the upper limit value of the light quantity for irradiation.

Figure 25:
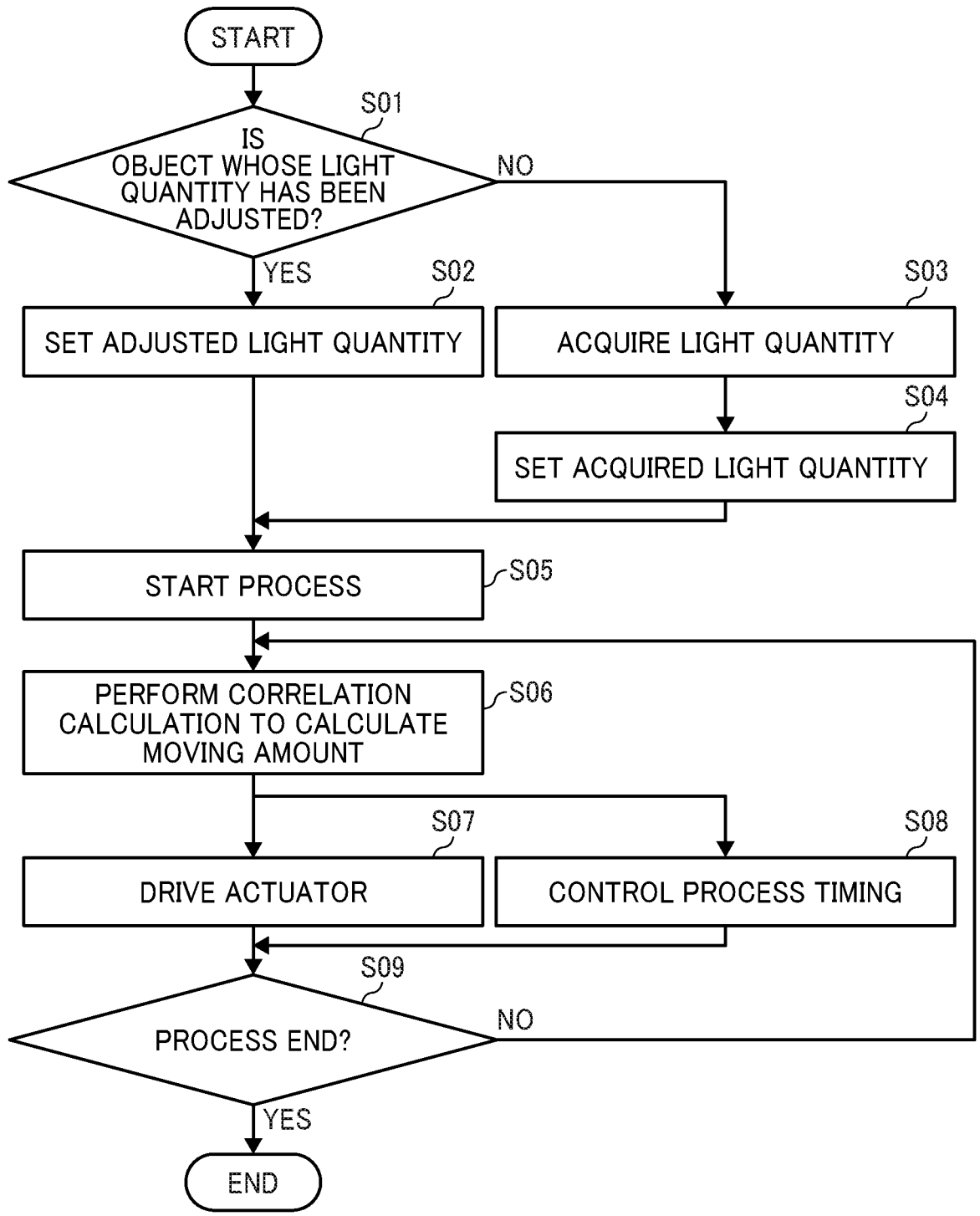
FIG. 25 is a schematic view of a variation of a liquid discharge apparatus according to the present disclosure.

FIG. 25 is a flowchart of the process of adjustment of the light quantity according to the present disclosure. Here, the "process" is a process to discharge the liquid. Referring to FIGS. 5 and 25, the controller 520 determines whether an object (web 120, for example) is the object whose light quantity has been adjusted (S01). Hereinafter, the object whose light quantity has been adjusted is simply referred to as "adjusted object". The controller 520 determines whether the object is the adjusted object by previously storing a type of the adjusted object in the past in the memory 521 in the controller 520 and compares the stored adjusted object and the type of the object input by the user.

If the object is the adjusted object in the past (YES in S01), the controller 520 transmits data of light quantity associated with the type of the adjusted object stored in the memory 521 in the controller 520 to the control circuit 52. Then, the control circuit 52 sets the light quantity based on the data of the light quantity transmitted from the controller 520 (S02). If the object is not the adjusted object in the past (NO in S01), the controller 520 performs the process of acquiring the light quantity as described in FIG. 16 (S03).

Then, the control circuit 52 sets the light quantity acquired by the process of acquiring the light quantity as described in FIG. 16 (S04). Then, the image forming apparatus 110 executes the process of discharging the liquid onto the web 120 (hereinafter, simply referred to as "discharge process") while conveying the object after the light quantity is determined in S02 or S04 (505).

The discharge process includes a calculation of the relative position, the moving speed, the moving amount, or the combination above of the web 120 using the adjusted light quantity and a control of the position of the head unit 210 and the timing of discharging the liquid by the head unit 210. The calculator 53F (see FIGS. 7 and 8) performs the correlation calculation to calculate the moving amount of the web 120 in the conveyance direction (S06) during executing the above described process.

The controller controls to drive the actuators (AC1 through AC4 in FIG. 3) in step S07 and controls the process timing (S08) based on the calculated moving amount. The controller 520 determines whether the process of the image forming apparatus 110 has ended after the controller 520 controls to drive the actuators AC and controls the processing timing in step S09. If the discharge process is not completed (S09, NO), the present process returns to step S06. If the above described discharge process completes (S09, YES), the present discharge process ends.

The step S07 and S08 are executed in parallel in FIG. 16. However, the step S07 and S08 may be executed in series or executed alternately.

[Variation]

Figure 26:
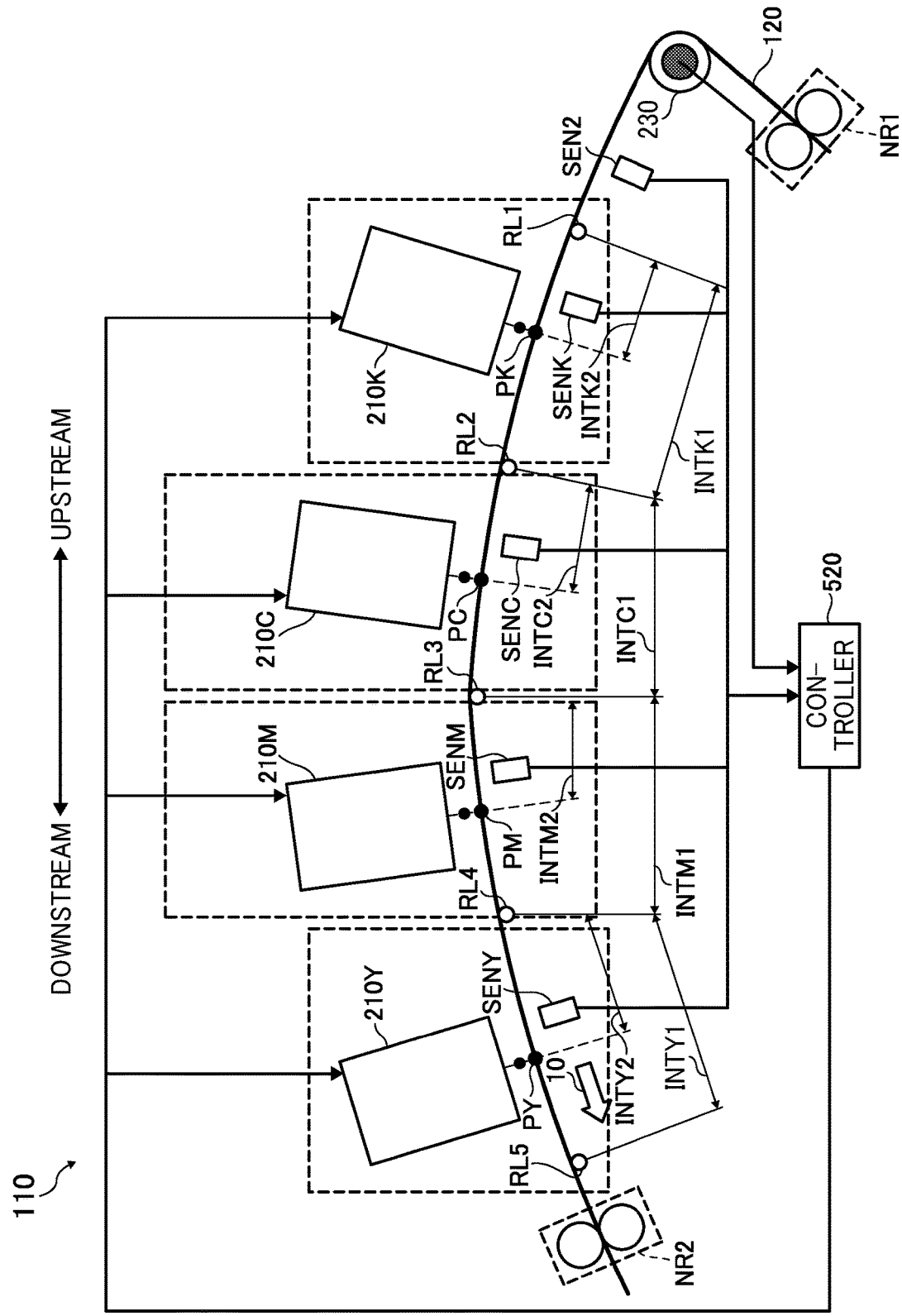
FIG. 26 is a schematic cross-sectional view of the image forming apparatus according to a second embodiment of the present disclosure.

FIG. 26 is a schematic view of a variation of the image forming apparatus 110 according to the present disclosure. The configuration illustrated in FIG. 26 differs from the configuration illustrated in FIG. 2 regarding the locations of the first support (e.g., the conveyance roller CR1C in FIG. 2) and the second support (e.g., the conveyance roller CR2K in FIG. 2). The first support and the second support may be implemented by a first roller RL1, a second roller RL2, a third roller RL3, a fourth roller RL4, and a fifth roller RL5. That is, the first support and the second support may commonly be used. Note that, the first support and the second support may also serve as rollers or may serve as curved plates.

Second Embodiment

In the flow illustrated in FIG. 16, the light quantity is adjusted using the laser light source LG of the black sensor device SENK, and the laser light source LG of the cyan sensor device SENC is matched with the light quantity of the laser light source LG of the black sensor device SENK. However, the light quantity may be individually adjusted for each laser light source LG so that the difference ΔPw detected by each sensor device SEN is maximized, respectively.

The light source LG is not limited to laser light sources but can be light emitting diodes (LED) or the like. For example, the light source may be an LED (Light Emitting Diode) or an organic EL (Electro-Luminescence) or the like. Depending on the light source, the pattern appeared on the web 120 (object) need not be a speckle pattern.

Further, the light source may be a light source having a single wavelength or a light source having a broad wavelength.

In the above embodiment, an image forming apparatus 110 that performs image formation using four color of head units 210 of black, cyan, magenta, and yellow has been described as an example. However, the image forming apparatus 110 may include a plurality of, for example, head units 210K for black to perform image formation.

Further, the object is not limited to a recording medium such as paper. The object is, for example, a material to which a liquid can adhere or the like. Examples of the material on which liquid can be adhered include any materials on which liquid can be adhered even temporarily, such as paper, thread, fiber, fabric, leather, metal, plastic, glass, wood, ceramic, and combination of the above.

The present embodiment may be realized by one image forming apparatus 110 or may be realized by two or more image forming apparatuses 110. For example, the head unit 210K for black and the head unit 210C for cyan are disposed inside a first casing, and the head unit 210M for magenta and the head unit 210Y for yellow are disposed inside a second casing. In this example, the image forming apparatus 110 is implemented as a system including two devices. In addition, each process described above may be performed in parallel, redundantly, or distributedly by a plurality of information processing apparatuses such as calculator 53F in the detector 600.

Further, the liquid used in the present disclosure is not limited to ink, and other types of recording liquid or fixation processing liquid or the like may be used. That is, an apparatus that discharges liquid (ink) according to the present disclosure may be applied to an apparatus that discharges a liquid of a type other than ink.

Therefore, an apparatus according to the present disclosure is not limited to an apparatus that performs an image forming process. For example, the object to be formed may be a three-dimensional object or the like.

Third Embodiment: Reading Apparatus

Figure 27:
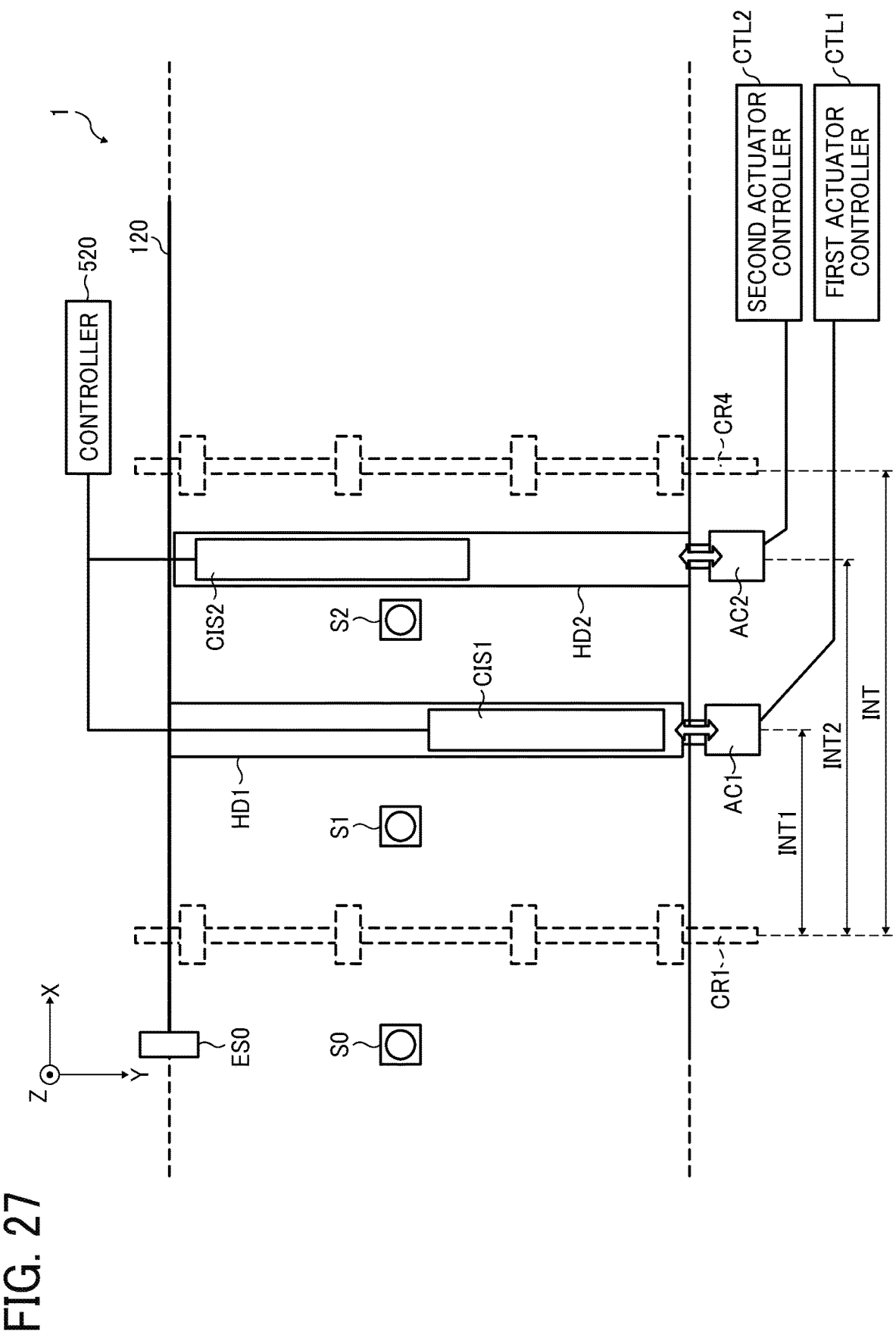
FIG. 27 is a schematic plan view of a reading apparatus according to a third embodiment of the present disclosure.

FIG. 27 is a schematic top view of a reading apparatus according to the third embodiment of the present disclosure. In the first embodiment and the second embodiment described above, an example of the image forming apparatus 110 including the head unit 210 that discharges the liquid and the conveyor including the nip roller pairs NR1 and NR2 and the roller 230 (see FIG. 2). However, the head unit may be a reading unit (scanner) to perform a reading process. In this case, the conveyor (the nip roller pairs NR1 and NR2 and the roller 230 in FIG. 2, for example) functions as a conveyor for the reading apparatus.

Figure 28:
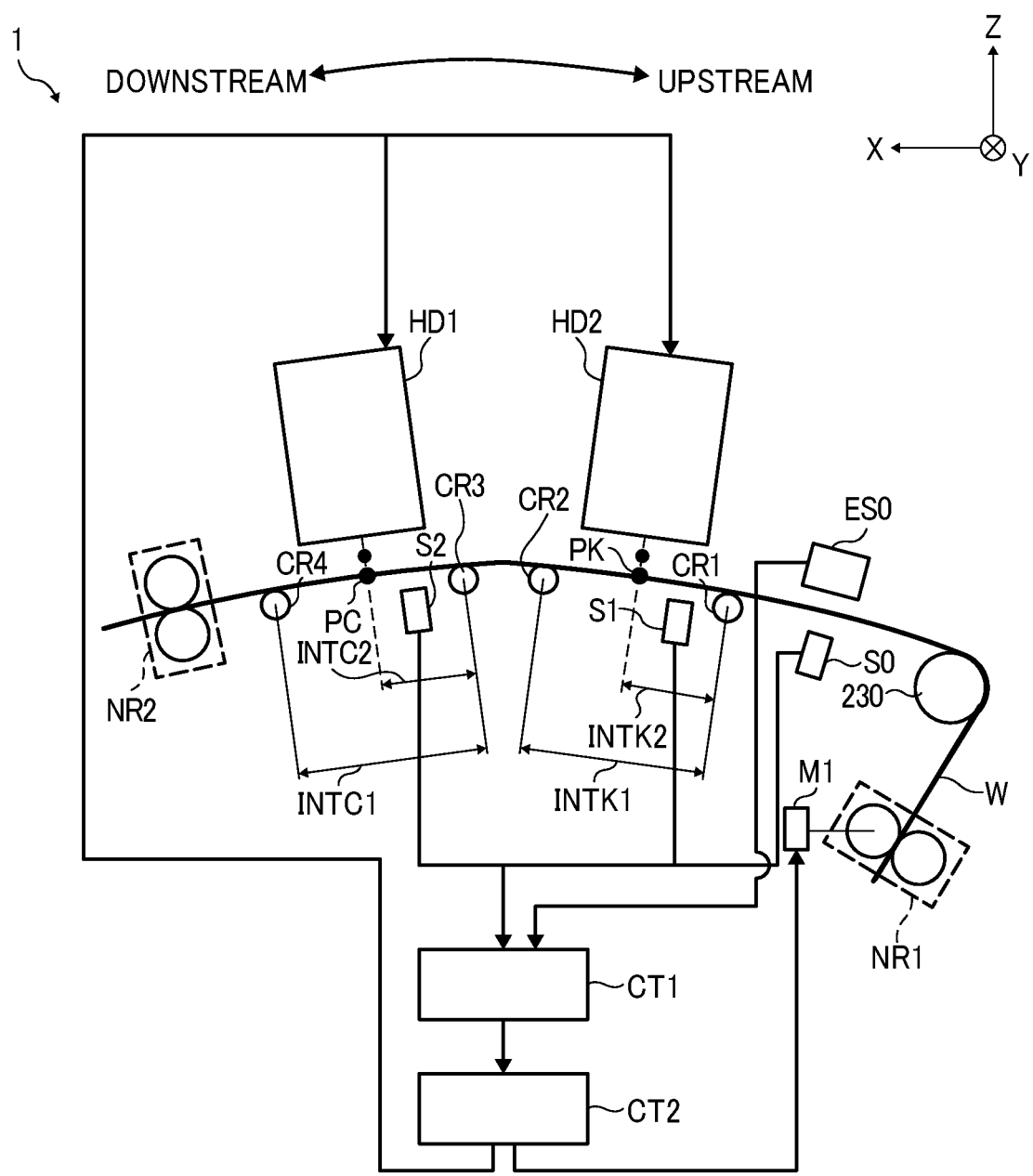
FIG. 28 is a schematic cross-sectional view of the reading apparatus according to another embodiment of the present disclosure.

The reading apparatus 1 reads an image on the web 120 by each of the head units HD1 and HD2 at different position along a conveyance path. The web 120 is conveyed by the conveyor including nip roller pairs NR1 and NR2 and a roller 230. The head units HD1 and HD2 include reading heads CIS1 and CIS2, respectively. The reading heads CIS1 and CIS2 include a group of a contact image sensors (CIS), respectively. In the present embodiment, the reading heads CIS1 and CIS2 perform a reading process at reading positions PK and PC as illustrated in FIG. 28.

The head units HD1 and HD2 include one or more reading heads disposed along the orthogonal direction 20, respectively. For example, as illustrated in FIG. 27, the reading apparatus 1 includes two head units HD1 and HD2. Although the reading apparatus in FIG. 27 includes two head units HD1 and HD2, a number of head units in the reading apparatus 1 is not limited to two, and may be three or more.

As illustrated in the FIG. 27, the head units HD1 and HD2 include one or more reading heads CIS1 and CIS2, respectively. In FIG. 27, the head unit HD1 includes one reading head CIS1, and the head unit HD2 includes one reading head CIS2. However, the head unit HD1 may include a reading head CIS3 disposed at a position extending in the orthogonal direction 20 of the reading head CIS1 and CIS2 and disposed in staggered manner with the reading head CIS1 and the reading head CIS2.

The head units HD1 and HD2 constitute a reading unit, a so-called scanner. Thus, the head units HD1 and HD2 read an image formed on the surface of the web 120 and output the image data indicating the read image or the like. The reading apparatus 1 can generate an image connected in the conveyance direction 10 and the orthogonal direction 20 by connecting the image data output from each head units HD1 and HD2.

The reading apparatus 1 in FIG. 27 includes support rollers CR1 and CR4 that are not provided between the head units HD1 and HD2. However, the number of support rollers CR provided between the head units HD1 and HD2 is not limited to one. As illustrated in FIG. 28, two or more support rollers CR2 and CR3 may be provided between the head units HD1 and HD2.

FIG. 28 is an enlarged side view of the reading apparatus 1 illustrated in FIG. 27. As similar to the first embodiment in FIG. 2, two pairs of nip rollers NR1 and NR2 and rollers 230 are provided on both sides of the support rollers CR1 to CR4 sandwiching the head units HD1 and HD2, respectively, as a conveyor. At least one of the nip rollers (NR1 in FIG. 28) among the pair of nip rollers NR1 and NR2 is a driving roller. A driving force is given to the driving roller NR1 by the motor M1 (see FIG. 28).

Further, the reading apparatus 1 includes a controller CT1 and an actuator controller CT2. The controller CT1 and the actuator controller CT2 are information processing apparatus. Specifically, the controller CT1 and the actuator controller CT2 have a hardware configuration including a CPU, an electronic circuit, a computing device such as a combination described above, a controller, a memory, an interface, and the like. The controller CT1 and the actuator controller CT2 may be a plurality of devices.

Installation positions of the sensor devices S1 and S2 are preferably disposed in a same manner as in FIG. 3.

[Processing Position of Head Unit]

Figure 29:
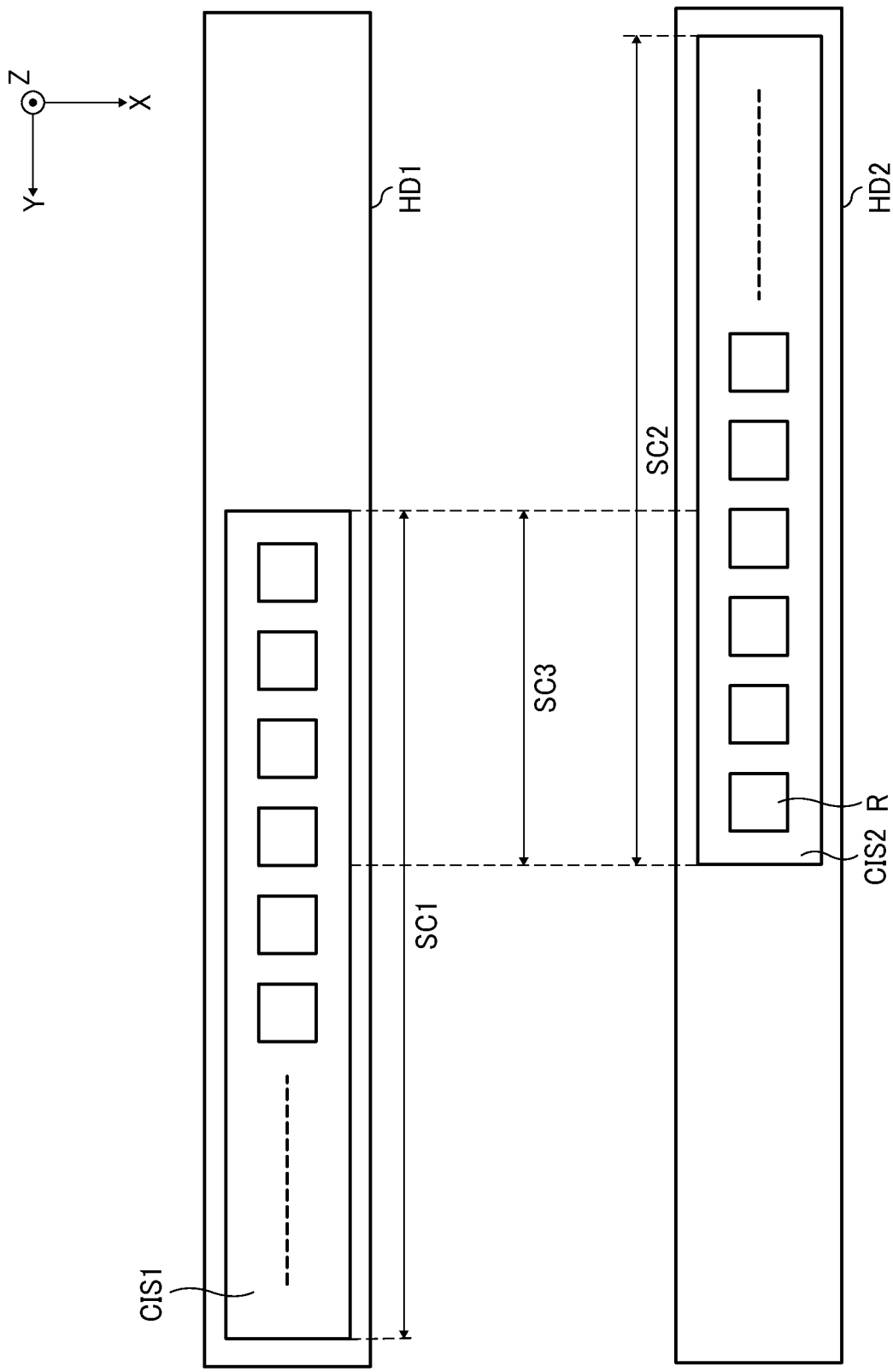
FIG. 29 is a schematic plan view of a process position of the head units HD1 and HD2 according to the present disclosure.

FIG. 29 is a schematic plan view of a process position of the head units HD1 and HD2 according to the present disclosure. The reading head CIS1 of the head unit HD1 and the reading head CIS2 of the head unit HD2 are disposed in staggered manner in Y-direction (orthogonal direction 20) as illustrated in FIG. 29. Further, each of the reading heads CIS1 and CIS2 includes a plurality of CIS elements arranged in a line in the Y-direction and includes a plurality of reading regions R associated with each CIS element.

Specifically, the reading head CIS1 of the head unit HD1 reads the reading range SC1 in the Y-direction (orthogonal direction 20) and generates read image data. Conversely, the reading head CIS2 of the head unit HD2 reads the reading range SC2 in the Y-direction (orthogonal direction 20) to generate read image data. As illustrated in FIG. 29, the reading range SC1 and the reading range SC2 partially overlap. Hereinafter, the overlapping range in which the reading range SC1 and the reading range SC2 overlap is referred to as "overlapping range SC3".

The head units HD1 and HD2 can read the identical object (web 120) in the overlapping range SC3. That is, the object (web 120) read by the head unit HD1 in the overlapping range SC3 is conveyed from upstream to downstream in the conveyance direction 10. Thus, the head unit HD2 can read the same object (web 120) at predetermined time after the head unit HD1 reads the web 120. Since an interval between the head unit HD1 and the head unit HD2 is known in advance, the reading apparatus 1 can calculate a timing at which the head unit HD2 reads the object (web 120) read by the head unit HD1 based on the moving speed of the object (web 120).

Figure 30:
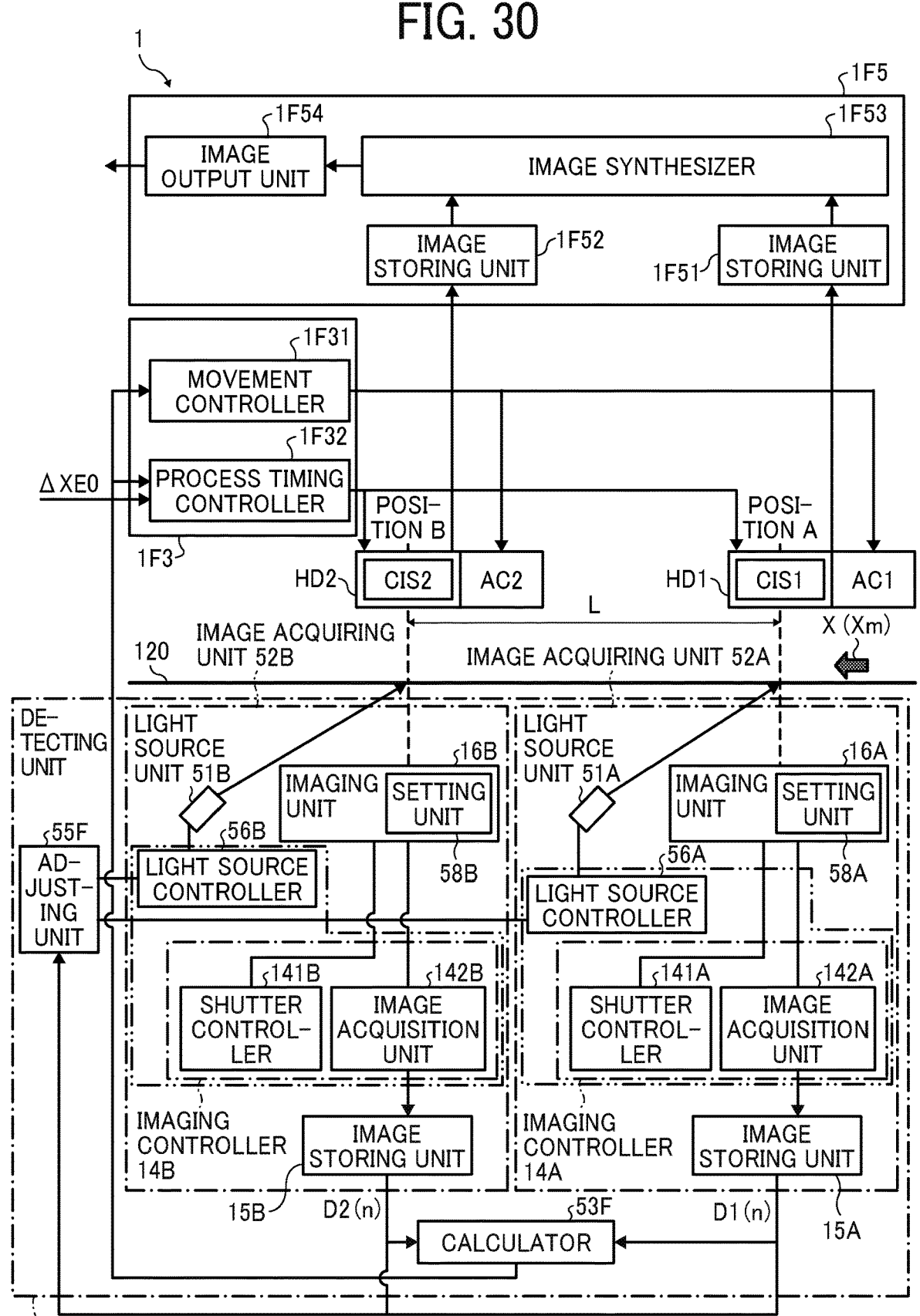
FIG. 30 is a schematic block diagram of a functional configuration of the reading apparatus according to the present disclosure.

Then, the reading apparatus 1 stores the image data read and generated by the head units HD1 and HD2 in image storing units 1F51 and 1F52 in the image processor 1F5 (see FIG. 30). The image processor 1F5 includes an image synthesizer 1F53 that connects each image data in the image storing units 1F51 and 1F52 based on the pixels of each image data in the overlapping range SC3. In this way, the image processor 1F5 of the reading apparatus 1 can connect the image data in the reading range SC1 and the reading range SC2 and generate a synthesized data.

The image processor 1F5 includes an image output unit 1F54 to output synthesized image data generated by connecting the image data in the image storing units 1F51 and 1F52. A direction of connecting the image data is not limited to the orthogonal direction 20 (Y-direction) and may be in the conveyance direction 10 (X-direction).

As described above, the reading apparatus 1 can connect read images and generate read image of a wide range without connection by the head units HD1 and HD2 disposed at different position.

[Functional Configuration]

FIG. 30 is a schematic block diagram of a functional configuration of the reading apparatus 1 according to the present disclosure. The reading apparatus 1 in FIG. 30 further includes a controller 1F3. Further, the reading apparatus 1 further includes an image processor 1F5 for processing read image data as illustrated in FIG. 30.

The controller 1F3 controls the head units HD1 and HD2. For example, the controller 1F3 preferably includes a functional configuration of a movement controller 1F31 and a process timing controller 1F32.

The movement controller 1F31 controls the actuators AC1 and AC2 based on the displacement amount calculated by the calculator 1F2. For example, the movement controller 1F31 is implemented by the actuator controller CT2 (see FIG. 28) or the like.

The process timing controller 1F32 controls timing of the reading process of the reading heads CIS1 and CIS2 in the head units HD1 and HD2, respectively, based on the displacement amount calculated by a calculator 1F2.

More specifically, the reading apparatus 1 changes process timing to compensate the displacement amount for "Δx" if the displacement amount in the conveyance direction 10 (X-direction) is "Δx" and the moving speed of the web 120 is "V". In this example, the reading apparatus 1 changes the process timing of the downstream reading head CIS2 for "$\Delta T = \Delta x/V$".

Thus, the reading apparatus 1 changes the process timing (reading timing) of the reading head CIS2 to be delayed by "ΔT" when the web 120 is conveyed with a delay by "Δx". Thus, the reading apparatus 1 can accurately perform the reading process in the conveyance direction 10 (X-direction).

If the displacement amount in the orthogonal direction 20 (Y-direction) is "Δy", the reading apparatus 1 moves the head units HD1 and HD2 to compensate for the displacement amount "Δy". The reading apparatus 1 drives and controls the actuators AC1 and AC2 to move the reading heads CIS1 and CIS2 in the head units HD1 and HD2, respectively, in the orthogonal direction 20. Thus, the reading apparatus 1 can move the reading position of the reading heads CIS1 and CIS2.

In this way, the reading apparatus 1 can accurately perform the process of reading image data (test chart or the like) in the conveyance direction 10 and the orthogonal direction 20. The reading apparatus 1 according to the present disclosure moves the head units HD1 and HD2 during the reading process to compensate the displacement amount. Thus, the reading apparatus 1 can accurately perform the reading process by the head units HD1 and HD2.

Further, as illustrated in FIG. 27, the reading apparatus includes an upstream sensor device S0 and an edge sensor ES0. The upstream sensor device S0 outputs surface data of web 120 at the most upstream in the X-direction (conveyance direction 10). The edge sensor ES0 outputs surface information of web 120 at an edge of the web 120 in the Y-direction (orthogonal direction 20). The upstream sensor device S0 and the edge sensor ES0 are arranged at an identical position in the X-direction (conveyance direction 10). Thus, the reading apparatus 1 according to the present disclosure can detect the displacement amount of the detection position of the speckle pattern from the reference position at the upstream sensor device S0.

Thus, the controllers CT1 and CT2 of the reading apparatus 1 can compensate for the displacement amount by driving and controlling the actuators AC1 and AC2 to move the reading heads CIS1 and CIS2 in the head units HD1 and HD2, respectively, in the orthogonal direction 20.

The reading apparatus 1 may read a displacement of the edge of the web 120 (hereinafter, simply referred to as "edge shift") during an initial adjustment and correct the reading position of the image of the sensor device SEN as illustrated in FIGS. 15 and 16 at the time of inspection performed by reading a test chart. In this case, the reading apparatus 1 calculate the edge shift of the web 120 (object) only at the initial adjustment. Thus, the calculator 53F may calculate only the change amount (meandering amount) of the web 120 when reading the image data during the conveyance of the web 120. Thus, the reading apparatus 1 can read a high-quality image while reducing a load on the controller 520.

As illustrated in FIGS. 17 and 18, the reading apparatus 1 may detect the edge shift in real time and reflect a detection result of the edge shift to correct the reading position of the sensor device SEN.

When the edge of the web 120 is detected in real time, the edge shift of the web 120 may be calculated by calculating an average of a latest acquired edge shift by a moving average or excluding the acquired edge shift to which noise is added using the filter. The reading apparatus 1 thus calculates the edge shift as described above to avoid an influence of lack of the edge or noise of web 120 at a timing of sensor sampling of the sensor device SEN during image reading. Thus, the reading apparatus 1 can detect an accurate image reading position.

The reading apparatus 1 detects the edge shift in real time and adjusts the position of the head units HD1 and HD2 (scanner) at a constant cycle during image reading. Thus, the reading apparatus 1 can read a higher quality image even if the edge shift occurs on the web 120 during conveyance of the web 120.

The third embodiment describes an example of the apparatus configured with a single unit. The image forming apparatus 110 as illustrated in FIGS. 1 and 2 may include the reading apparatus 1 illustrated in FIG. 30 as a part of the image forming apparatus 110.

For example, the reading apparatus 1 according to the present disclosure may be disposed at the rear stage of the image forming apparatus 110 illustrated in FIGS. 2 and 3. Then, the reading apparatus 1 may read a test chart, on which images are formed for inspection to adjust the ink discharge position (ink landing position) of the liquid onto the web 120.

In this case, the head units HD1 and HD2 images (captures) and reads a test pattern to inspect an image. The head units HD1 and HD2 function as a scanner of the reading apparatus 1. The test pattern includes a pattern such as a gradation pattern adjusted in density for correcting the ink discharge position of the liquid onto the web 120.

The reading apparatus 1 according to the present disclosure may include a controller (reading result processor or recording head discharge position setting unit, etc.) in addition to a mechanism for reading color information of the image by the head units HD1 and HD2 as the scanner.

Further, the image forming apparatus 110 described in the first embodiment illustrated in FIGS. 2 and 26 may include the reading apparatus 1 described in the third embodiment illustrated in FIGS. 27 and 28. The image forming apparatus 110 including the reading apparatus 1 can accurately inspect the ink discharge position and form a high-quality image reflecting the result of the inspection.

Figure 31B:
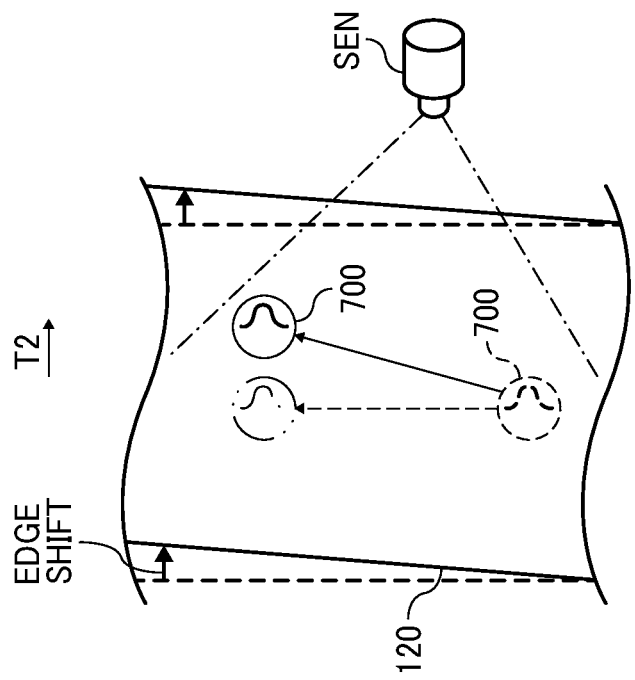
FIGS. 31A and 31B are schematic perspective views of the detection device according to another embodiment of the present disclosure.
Figure 31A:
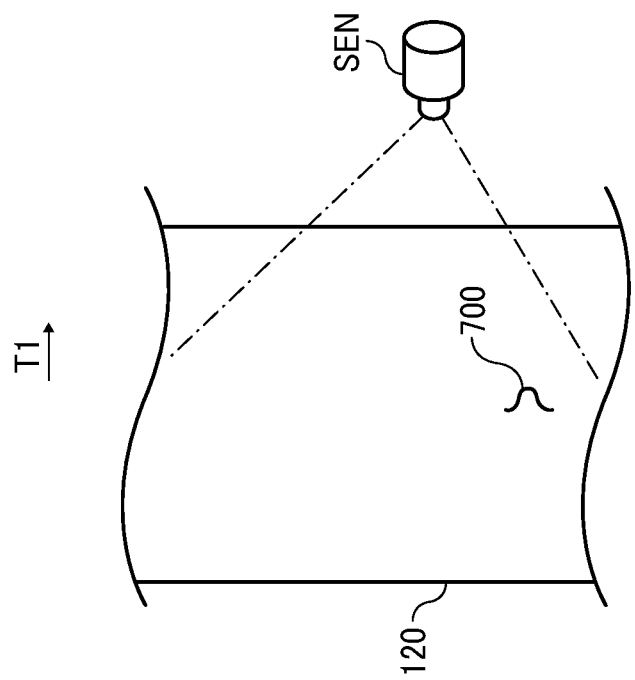

FIGS. 31A and 31B are schematic perspective views of the detection device SEN according to another embodiment of the present disclosure.

The above embodiment describes an example in which correlation calculation or the like is performed based on image data of a pattern output from a plurality of sensor devices SENK, SENC, SENM, and SENY.

However, as illustrated in FIGS. 31A and 31B, a single sensor device SEN having wide visual field angle may capture the same web 120 at different times T1 and T2 and output two image data and perform correlation calculation on the two-image data. The single sensor device SEN having wide visual field angle can capture the movement of the speckle pattern (unevenness) 700 in the web 120 within the view of the sensor device SEN by capturing the web 120 at different times T1 and T2 if the time difference between timing T1 and T2 are very short. Thus, the controller 520 can detect the relative position, the moving amount, the moving speed, the edge shift, or a combination the above of the object (web 120) between different times T1 and T2.

The above-described image forming apparatus 110 and reading apparatus 1 according to the present disclosure may be implemented by a program which causes a computer such as the detector 600, for example, to execute an adjustment method. Therefore, when the adjustment method is executed based on the program, the calculator 53F and the controller 520 in the computer perform computation and control based on the program in order to execute each process. Further, the memory of the computer stores data used to execute each process based on a program.

The program may be stored in a computer-readable memory for distribution. The recording medium may be a medium such as a magnetic tape, a flash memory, an optical disk, a magneto-optical disk, or a magnetic disk. Further, the program can be distributed through an electric communication line.

Further, the present disclosure may adapt a configuration in which a processor such as the image forming apparatus 110 or the reading apparatus 1 includes a line-shaped head that moves in the orthogonal direction 20 to perform some process (image forming, reading, for example) on a conveyed object. For example, the image forming apparatus may include head unit that emits laser beam (hereinafter, simply referred to as "laser head") to perform laser patterning on a substrate. The laser heads move in the orthogonal direction 20. Then, the image forming apparatus may detect the position of the substrate and move the laser head. Further, the image forming apparatus may include a plurality of laser heads arranged in a line.

The head units may read an image formed on the object and generate image data.

The number of the heads is not necessarily two or more. The image forming apparatus according to the present disclosure may continue to perform a process (image forming, reading, laser patterning, for example) at the position on the object identical to the reference position.

The present disclosure is not limited to the details of the exemplary embodiments described above and various modifications and improvements are possible.

The term "liquid discharge apparatus" used herein is an apparatus including the liquid discharge head or the liquid discharge device to discharge liquid by driving the liquid discharge head. The liquid discharge apparatus may be, for example, an apparatus capable of discharging liquid to a material to which liquid can adhere and an apparatus to discharge liquid toward gas or into liquid.

The "liquid discharge apparatus" may include devices to feed, convey, and eject the material on which liquid can adhere. The liquid discharge apparatus may further include a pretreatment apparatus to coat a treatment liquid onto the material, and a post-treatment apparatus to coat a treatment liquid onto the material, on which the liquid has been discharged.

The "liquid discharge apparatus" may be, for example, an image forming apparatus to form an image on a sheet by discharging ink, or a solid fabrication apparatus (three-dimensional fabricating apparatus) to discharge a fabrication liquid to a powder layer in which powder material is formed in layers, to form a solid fabrication object (three-dimensional fabrication object).

In addition, "the liquid discharge apparatus" is not limited to such an apparatus to form and visualize meaningful images, such as letters or figures, with discharged liquid. For example, the liquid discharge apparatus may be an apparatus to form meaningless images, such as meaningless patterns, or fabricate three-dimensional images.

The above-described term "material on which liquid can be adhered" represents a material on which liquid is at least temporarily adhered, a material on which liquid is adhered and fixed, or a material into which liquid is adhered to permeate. Examples of the "medium on which liquid can be adhered" include recording media, such as paper sheet, recording paper, recording sheet of paper, film, and cloth, electronic component, such as electronic substrate and piezoelectric element, and media, such as powder layer, organ model, and testing cell. The "medium on which liquid can be adhered" includes any medium on which liquid is adhered, unless particularly limited.

Examples of the material on which liquid can be adhered include any materials on which liquid can be adhered even temporarily, such as paper, thread, fiber, fabric, leather, metal, plastic, glass, wood, ceramic, construction materials (e.g., wall paper or floor material), and cloth textile.

Further, the term "liquid" includes any liquid having a viscosity or a surface tension that can be discharged from the head. However, preferably, the viscosity of the liquid is not greater than 30 mPa·s under ordinary temperature and ordinary pressure or by heating or cooling.

Examples of the liquid include a solution, a suspension, or an emulsion including, for example, a solvent, such as water or an organic solvent, a colorant, such as dye or pigment, a functional material, such as a polymerizable compound, a resin, or a surfactant, a biocompatible material, such as DNA, amino acid, protein, or calcium, and an edible material, such as a natural colorant.

Such a solution, a suspension, or an emulsion can be, e.g., inkjet ink, surface treatment solution, a liquid for forming components of electronic element or light-emitting element or a resist pattern of electronic circuit, or a material solution for three-dimensional fabrication.

"The liquid discharge apparatus" may be an apparatus to relatively move a head and a medium on which liquid can be adhered. However, the liquid discharge apparatus is not limited to such an apparatus. For example, the liquid discharge apparatus may be a serial head apparatus that moves the head or a line head apparatus that does not move the head.

Examples of the "liquid discharge apparatus" further include a treatment liquid coating apparatus to discharge a treatment liquid to a sheet surface to coat the sheet surface with the treatment liquid to reform the sheet surface and an injection granulation apparatus to discharge a composition liquid including a raw material dispersed in a solution from a nozzle to mold particles of the raw material.

The "liquid discharge device" is an integrated unit including the liquid discharge head and a functional parts or mechanisms, and is an assembly of parts relating to liquid discharge. For example, "the liquid discharge device" may be a combination of the head with at least one of a head tank, a carriage, a supply unit, a maintenance unit, and a main scanner.

Herein, the terms "integrated" or "united" mean fixing the head and the functional parts (or mechanism) to each other by fastening, screwing, binding, or engaging and holding one of the head and the functional parts movably relative to the other. The liquid discharge head may be detachably attached to the functional parts or mechanisms each other.

The main scanner may be a guide only. The supply unit may be a tube(s) only or a mount part (loading unit) only.

The term "liquid discharge head" used herein is a functional component to discharge or jet liquid from nozzles. Examples of an energy source for generating energy to discharge liquid include a piezoelectric actuator (a laminated piezoelectric element or a thin-film piezoelectric element), a thermal actuator that employs a thermoelectric conversion element, such as a heating resistor (element), and an electrostatic actuator including a diaphragm and opposed electrodes.

In the present embodiment, "sheet" is not limited to paper materially, but includes transparent sheets, cloth, glass, substrates, others to which ink droplets and other liquids can be attached, and articles referred to as a recording medium, a recording sheet, recording paper, etc. The terms "image formation", "recording", "printing", and "image printing" used herein may be used synonymously with each another.

The term "ink" is not limited to "ink" in a narrow sense, unless specified, but is used as a generic term for any types of liquid usable as targets of image formation such as recording liquid, fixing solution, and liquid. For example, the term "ink" also includes DNA sample, resist, pattern material, resin, and so on.

The term "image" used herein is not limited to a two-dimensional image and includes, for example, an image applied to a three-dimensional object and a three-dimensional object itself formed as a three-dimensionally molded image.

The present embodiment is described in detail using the embodiments. The embodiments described above are merely an example, and various modifications can be made within a range not deviating from the scope of the appended claims.

Numerous additional modifications and variations are possible in light of the above teachings. Such modifications and variations are not to be regarded as a departure from the scope of the present disclosure and appended claims, and all such modifications are intended to be included within the scope of the present disclosure and appended claims.

For example, any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming apparatus, comprising:
   a detector configured to detect an object; and
   a head configured to form an image on the object according to a detection of the detector, wherein the detector comprises:
      a light source configured to irradiate an object with light;
      a sensor configured to capture a first pattern and a second pattern formed on the object with the light irradiated by the light source, the first pattern and the second pattern imaged by the sensor at different times; and
      a circuit configured to:
         control the light source to adjust a light quantity of the light according to a type of the object, and irradiate the object with the light quantity adjusted according to the type of the object;
         calculate a relative position of the object between the first pattern and the second pattern; and
         control the head to form the image on the object according the relative position
         wherein the first pattern and the second pattern are imaged at different positions, and
         wherein the first pattern and the second pattern are formed by the light interfering by an uneven surface of the object.

2. The image forming apparatus according to claim 1, further comprising:
   a first support disposed upstream of the head in a conveyance direction of the object, and configured to convey the object to a position opposite the head; and
   a second support disposed downstream of the head in the conveyance direction of the object, and configured to convey the object from the position opposite the head, wherein the sensor is disposed between the first support and the second support.

3. The image forming apparatus according to claim 2, wherein the sensor is disposed between the first support and the position opposite the head.

4. The image forming apparatus according to claim 1, wherein the circuit is configured to control a timing at which the head forms the image on the object according the relative position calculated by the circuit.

5. The image forming apparatus according to claim 1, further comprising an actuator configured to move the head according to the relative position calculated by the circuit.

6. The image forming apparatus according to claim 5, wherein the actuator is configured to move the head in an orthogonal direction perpendicular to a conveyance direction of the object.

7. The image forming apparatus according to claim 1, wherein the head is configured to discharge liquid onto the object to form the image on the object.

8. The image forming apparatus according to claim 1, wherein the head is configured to irradiate the object with laser light to form the image on the object.

9. The image forming apparatus according to claim 1, further comprising:
   a controller configured to determine the light quantity of light for irradiating the object based on the type of the object, and to execute a process while conveying the object; and
   a plurality of sensor devices spaced apart along a conveyance path of the object;
   wherein a first one of the sensor devices at a first position along the conveyance path is configured to irradiate the object with the light having the light quantity set according to the type of the object, and to image a pattern formed on the object with the light at the first position;
   wherein a second one of the sensor devices at a second position along the conveyance path is configured to irradiate the object with the light having the light quantity set according to the type of the object, and to image the pattern formed on the object with the light at the second position;
   wherein the controller is further configured to calculate a moving amount of the object based on the pattern imaged at the first position and the pattern imaged at the second position, and to adjust at least one of a process timing and a process position of the head for the process based on the moving amount.

10. The apparatus according to claim 9 wherein:
    the process comprises a discharge process where the head is configured to discharge a recording liquid onto the object.

11. The apparatus according to claim 9 wherein:
    the controller is configured to control an actuator connected to the head to adjust the process position of the head.

12. The apparatus according to claim 9, further comprising:
    a first support disposed upstream of the head along the conveyance path, and configured to convey the object to a position opposite the head; and
    a second support disposed downstream of the head along the conveyance path, and configured to convey the object from the position opposite the head, wherein the second one of the sensor devices is disposed between the first support and the second support.

* * * * *